United States Patent
Matsuura

(10) Patent No.: US 10,134,363 B2
(45) Date of Patent: Nov. 20, 2018

(54) DISPLAY DEVICE, DISPLAY CONTROL METHOD, AND NON-TRANSITORY RECORDING MEDIUM STORING COMPUTER READABLE DISPLAY CONTROL PROGRAM

(71) Applicant: Konica Minolta, Inc., Chiyoda-ku, Tokyo (JP)

(72) Inventor: Tsumoru Matsuura, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 50 days.

(21) Appl. No.: 14/725,244

(22) Filed: May 29, 2015

(65) Prior Publication Data
US 2015/0347876 A1 Dec. 3, 2015

(30) Foreign Application Priority Data

Jun. 2, 2014 (JP) .................................. 2014-114250

(51) Int. Cl.
*G09G 5/14* (2006.01)
*G09G 5/32* (2006.01)
*H04N 1/393* (2006.01)

(52) U.S. Cl.
CPC ................. *G09G 5/14* (2013.01); *G09G 5/32* (2013.01); *H04N 1/393* (2013.01); *G09G 2340/0492* (2013.01); *G09G 2340/12* (2013.01)

(58) Field of Classification Search
None
See application file for complete search history.

(56) References Cited

U.S. PATENT DOCUMENTS

2008/0150947 A1* 6/2008 Suzuki .................. G06F 17/214
345/472
2008/0252662 A1* 10/2008 Hyatt .................... G06F 3/0481
345/660

(Continued)

FOREIGN PATENT DOCUMENTS

JP 9-62247 A 3/1997
JP 2000-314636 A 11/2000

(Continued)

OTHER PUBLICATIONS

Office Action (Notice of Grounds for Rejection) dated Oct. 4, 2016 by the Japanese Patent Office in corresponding Japanese Patent Application No. 2014-114250, and English language translation of Office Action (10 pages).

*Primary Examiner* — Xiao Wu
*Assistant Examiner* — Mohammad H Akhavannik
(74) *Attorney, Agent, or Firm* — Buchanan Ingersoll & Rooney PC

(57) ABSTRACT

A display device that displays a character string on a display frame in a default display state includes: a receiving unit configured to receive designation of a first display magnification; a magnification changing unit configured to perform a magnification change process to change display magnifications by setting a display magnification for the display frame at the first display magnification and setting a display magnification for the character string at a second display magnification lower than the first display magnification, when the first display magnification is higher than a display magnification in the default display state; and a display control unit configured to perform control so that only characters falling within the display frame having the display magnification changed to the first display magnification are displayed, the only characters being of the char- (Continued)

acter string having the display magnification changed to the second display magnification.

21 Claims, 23 Drawing Sheets

(56) References Cited

U.S. PATENT DOCUMENTS

| | | | |
|---|---|---|---|
| 2010/0079490 A1 | 4/2010 | Terazono et al. | |
| 2012/0315607 A1 | 12/2012 | Shin et al. | |
| 2013/0155423 A1* | 6/2013 | Shibata | H04N 1/00411 358/1.2 |
| 2013/0194277 A1* | 8/2013 | Takishima | G06T 3/40 345/472 |
| 2014/0157321 A1* | 6/2014 | Kurita | H04N 21/4858 725/47 |

FOREIGN PATENT DOCUMENTS

| | | |
|---|---|---|
| JP | 2009-122906 A | 6/2009 |
| JP | 2009-258867 A | 11/2009 |
| JP | 2009-282827 A | 12/2009 |
| JP | 2013-012041 A | 1/2013 |
| JP | 2013-186593 A | 9/2013 |
| JP | 2015-153083 A | 8/2015 |
| WO | 2008/075489 A1 | 6/2008 |
| WO | 2009/004692 A1 | 1/2009 |

* cited by examiner

FIG. 4

| ITEM OBJECT | | | | | | | | | | | | |
|---|---|---|---|---|---|---|---|---|---|---|---|---|
| ID | DISPLAY ITEM NAME | DISPLAY AREA | DISPLAY OBJECT | | | | | | CURRENT CHARACTER DISPLAY MAGNIFICATION L (%) | TOTAL NUMBER OF CHARACTERS | NUMBER OF AREA DISPLAYABLE CHARACTERS | CHARACTER DISPLAY RATE (%) | CURRENT NON-CHARACTER DISPLAY MAGNIFICATION M (%) |
| | | | TYPE | DISPLAY AREA | DISPLAY CONTENTS | FONT | SIZE | SPACING | | | | | |
| A000 | COLOR SETTING | (20, 5)–(110, 120) | TEXT | (32, 7)–(93, 25) | COLOR | GOTHIC | 18 | NORMAL | 100 | 5 | 5 | 100 | 100 |
| A001 | SELECT KEY | (30, 30)–(95, 50) | TEXT | (32, 32)–(93, 48) | AUTOCOLOR | GOTHIC | 18 | NORMAL | 100 | 9 | 5 | 56 | |
| A002 | SELECT KEY | (30, 60)–(95, 80) | TEXT | (32, 62)–(93, 78) | FULLCOLOR | GOTHIC | 18 | NORMAL | 100 | 9 | 5 | 56 | |
| A003 | SELECT KEY | (30, 90)–(95, 110) | TEXT | (32, 92)–(93, 108) | BLACK&WHITE | GOTHIC | 18 | NORMAL | 100 | 11 | 5 | 45 | |
| A004 | CANCEL KEY | (140, 120)–(195, 150) | TEXT | (142, 122)–(193, 148) | CANCEL | GOTHIC | 18 | NORMAL | 100 | 6 | 6 | 100 | |
| A005 | CONFIRMATION KEY | (205, 120)–(260, 150) | TEXT | (207, 122)–(258, 148) | OK | GOTHIC | 18 | NORMAL | 100 | 2 | 6 | 100 | |

FIG. 15

| ITEM OBJECT | | | DISPLAY OBJECT | | | | | | | | | CURRENT NON-CHARACTER DISPLAY MAGNIFICATION M (%) |
|---|---|---|---|---|---|---|---|---|---|---|---|---|
| ID | DISPLAY ITEM NAME | DISPLAY AREA | TYPE | DISPLAY AREA | DISPLAY CONTENTS | FONT | SIZE | SPACING | CURRENT CHARACTER DISPLAY MAGNIFICATION L (%) | TOTAL NUMBER OF CHARACTERS | NUMBER OF AREA DISPLAYABLE CHARACTERS | CHARACTER DISPLAY RATE (%) | |
| A000 | COLOR SETTING PANEL | (20, 5)-(110, 120) | | | | | | | | | | | 100 |
| A001 | SELECT KEY | (30, 30)-(95, 50) | TEXT | (32, 7)-(93, 25) | COLOR | GOTHIC | 18 | NORMAL | 100 | 5 | 5 | 100 | |
| | | | TEXT | (32, 32)-(55, 48) | AUTO | GOTHIC | 18 | NORMAL | 100 | 4 | 2 | 50 | |
| | | | TEXT | (57, 32)-(93, 48) | COLOR | GOTHIC | 18 | NORMAL | 100 | 5 | 3 | 60 | |
| A002 | SELECT KEY | (30, 60)-(95, 80) | TEXT | (32, 62)-(55, 78) | FULL | GOTHIC | 18 | NORMAL | 100 | 4 | 2 | 50 | |
| | | | TEXT | (57, 62)-(93, 78) | COLOR | GOTHIC | 18 | NORMAL | 100 | 5 | 3 | 60 | |
| A003 | SELECT KEY | (30, 90)-(95, 110) | TEXT | (32, 92)-(55, 108) | BLACK | GOTHIC | 18 | NORMAL | 100 | 5 | 2 | 40 | |
| | | | TEXT | (57, 92)-(68, 108) | & | GOTHIC | 18 | NORMAL | 100 | 1 | 1 | 100 | |
| | | | TEXT | (70, 92)-(93, 108) | WHITE | GOTHIC | 18 | NORMAL | 100 | 5 | 2 | 40 | |
| A004 | CANCEL KEY | (140, 120)-(195, 150) | TEXT | (142, 122)-(193, 148) | CANCEL | GOTHIC | 18 | NORMAL | 100 | 6 | 6 | 100 | |
| A005 | CONFIRMATION KEY | (205, 120)-(260, 150) | TEXT | (207, 122)-(258, 148) | OK | GOTHIC | 18 | NORMAL | 100 | 2 | 6 | 100 | |

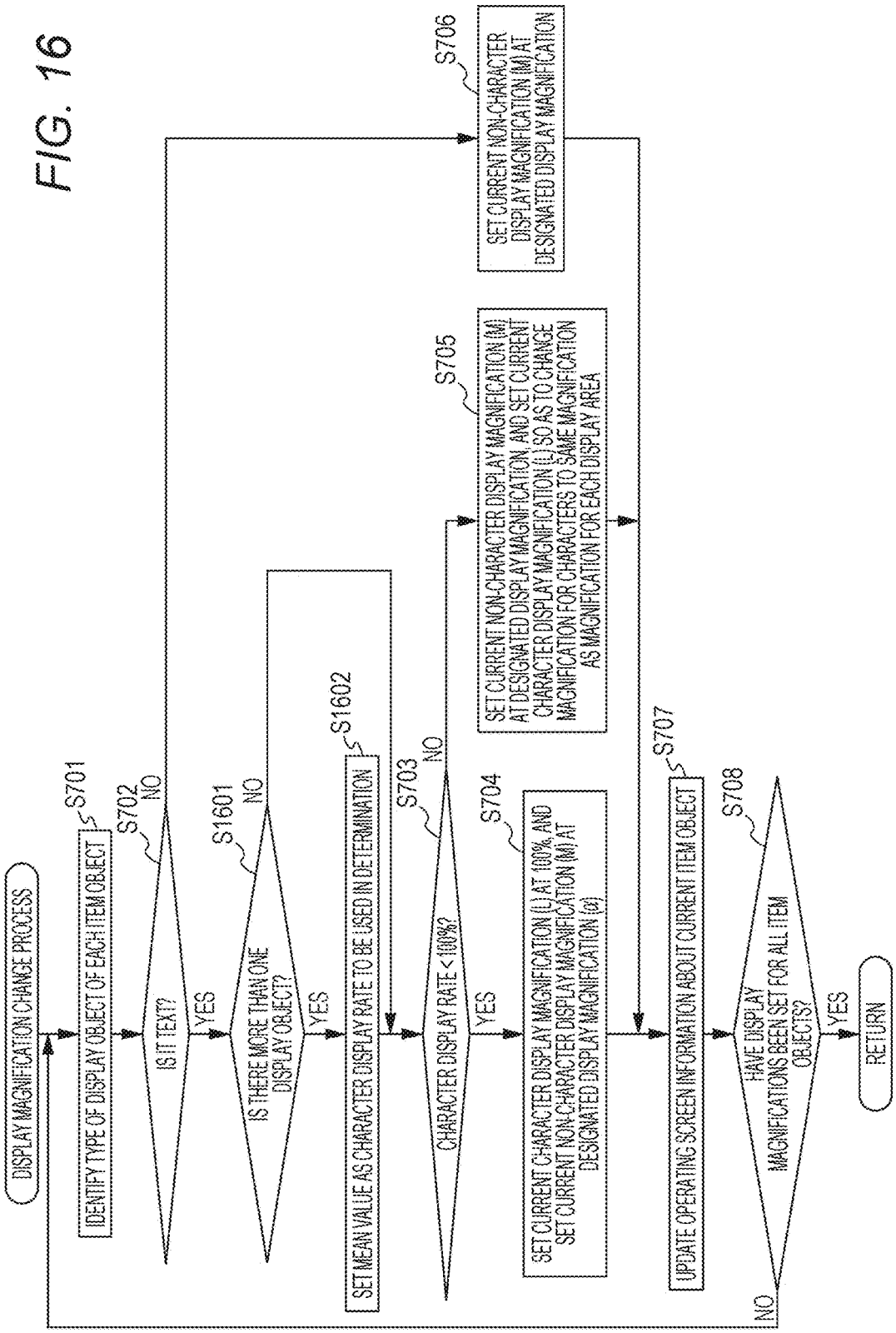

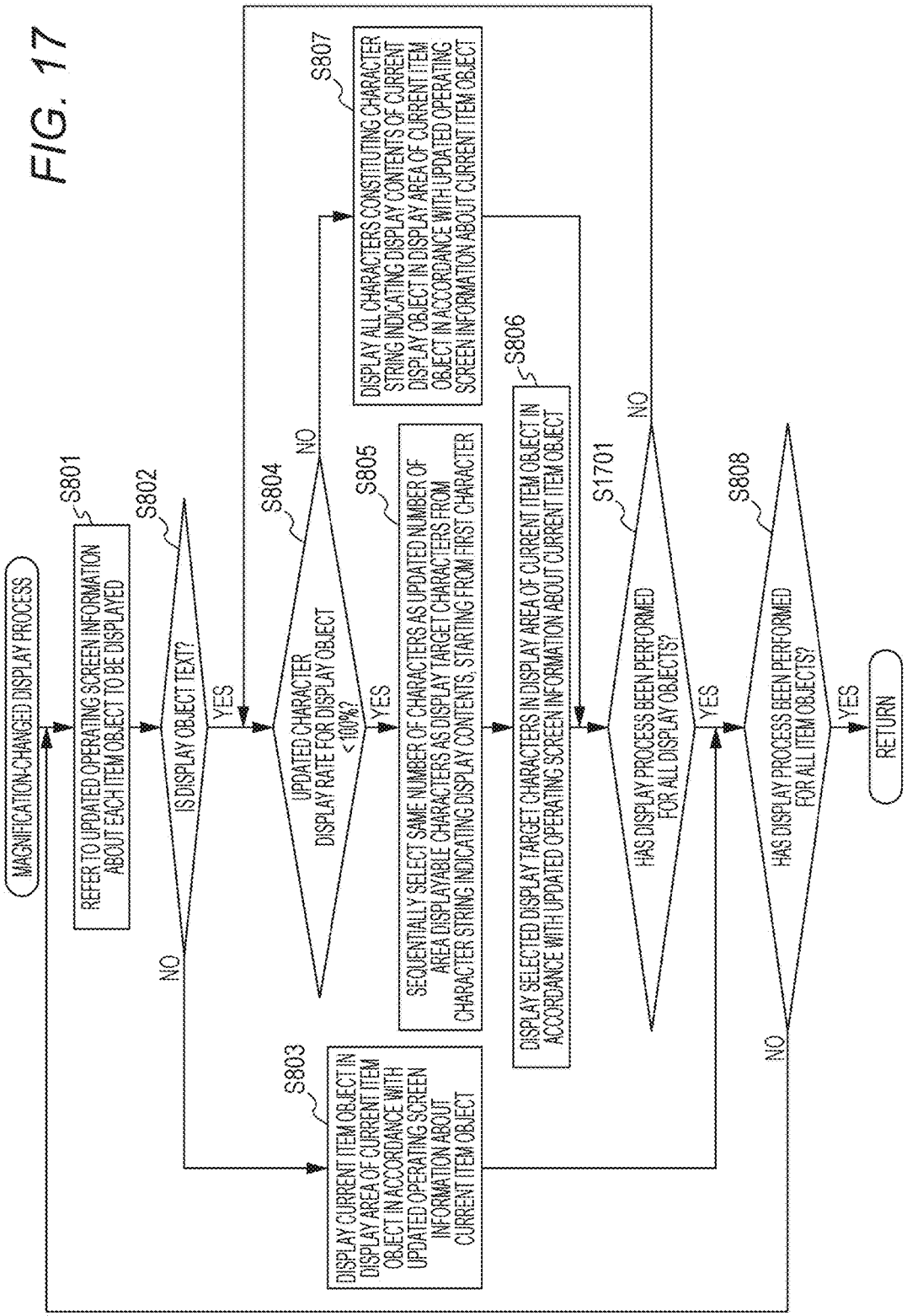

FIG. 26

| DESIGNATED DISPLAY MAGNIFICATION (α) (%) | SELECT CHARACTER STRING |
|---|---|
| 100 TO 119 | BW |
| 120 TO 139 | B&W |
| 140 TO 159 | BLK&W |
| 160 TO 179 | BLK&WHT |
| 180 TO 199 | BLACK&WHT |
| 200 TO 219 | BLACK&WHIT |

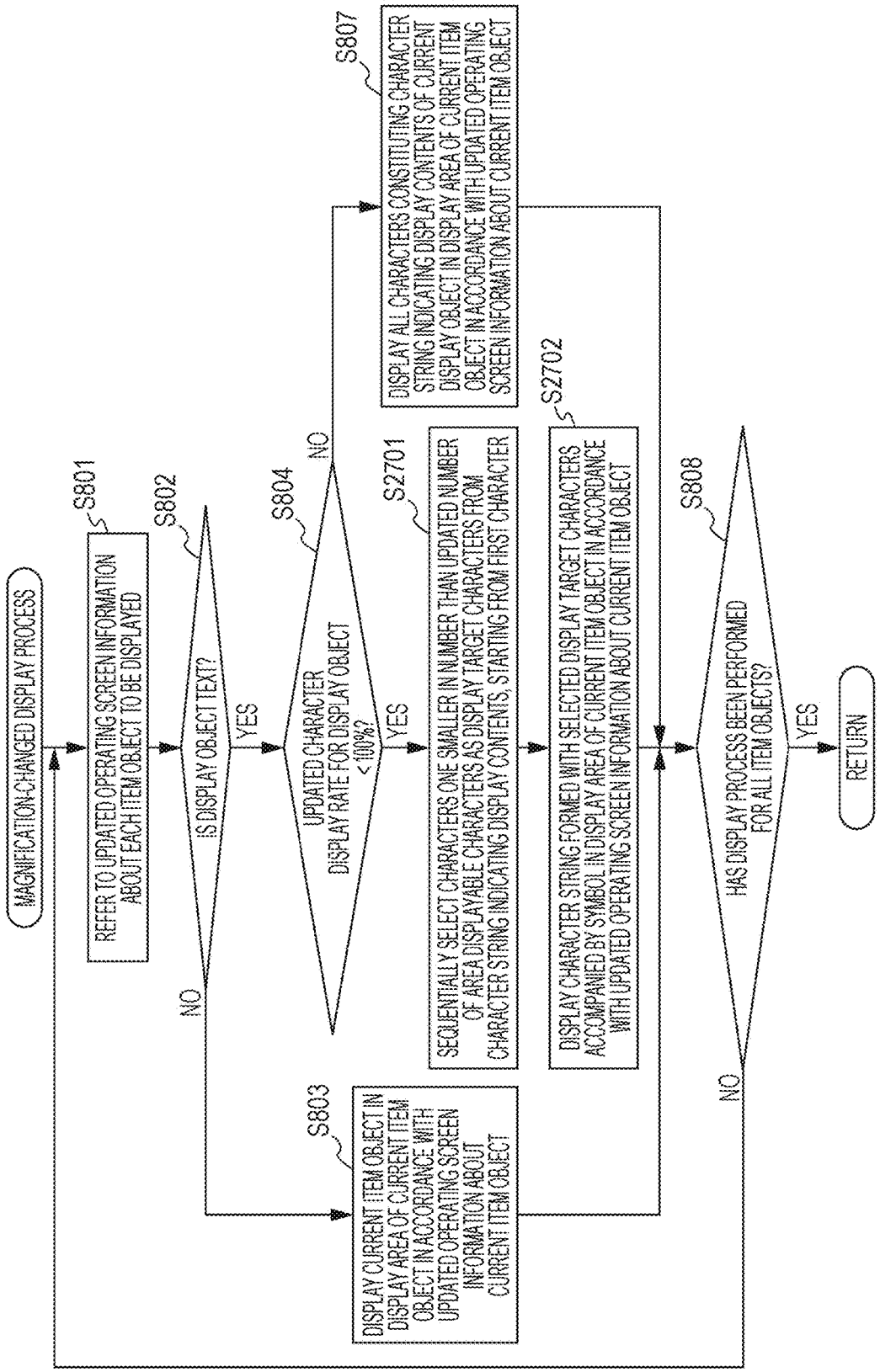

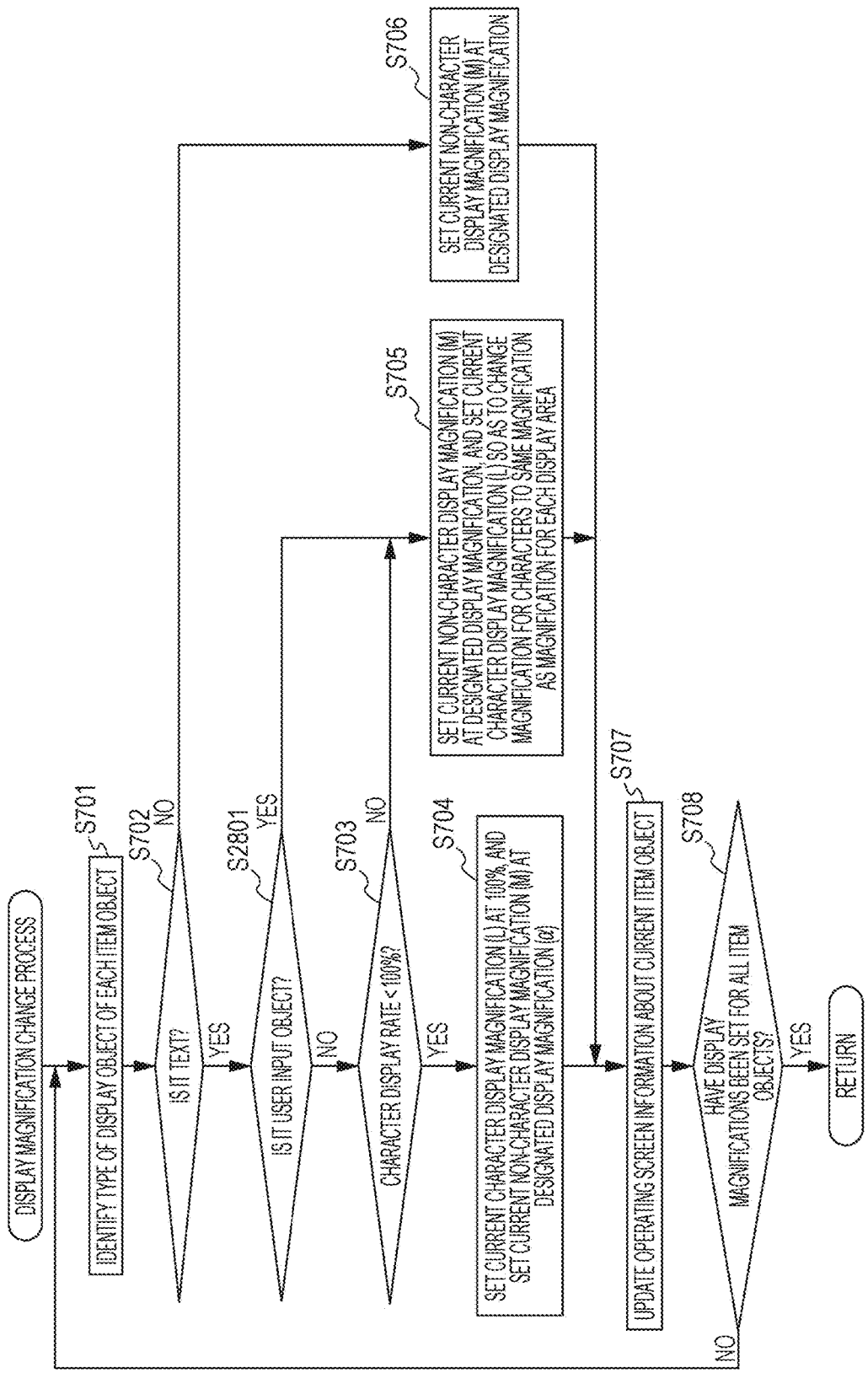

DISPLAY DEVICE, DISPLAY CONTROL METHOD, AND NON-TRANSITORY RECORDING MEDIUM STORING COMPUTER READABLE DISPLAY CONTROL PROGRAM

The entire disclosure of Japanese Patent Application No. 2014-114250 filed on Jun. 2, 2014 including description, claims, drawings, and abstract are incorporated herein by reference in its entirety.

BACKGROUND OF THE INVENTION

Field of the Invention

The present invention relates to a display device that displays character strings on display frames of a predetermined shape, and more particularly, to a technology for controlling display of character strings that do not fall within the display frames.

Description of the Related Art

Display devices that display information about electronic apparatuses, operation buttons for accepting user operations, and the like are widely used these days in various kinds of electronic apparatuses such as image forming apparatuses like printers and copying machines, portable information terminal devices, and car navigation systems.

A user can recognize various kinds of information about an electronic apparatus by looking at display objects such as character strings shown in display frames displayed on a display device.

Meanwhile, as the above mentioned electronic apparatuses are used not only in Japan but also in various other countries, the various kinds of information need to be provided in many different languages. Where information is displayed in many different languages, the number of characters displayed to show the same information varies. In some languages, not all the characters necessary for displaying the information can be displayed in display frames in a default display state.

As a technology for solving the above problem, JP 2013-12041 A discloses a technology for displaying part of a character string outside the display frame for the character string that is a display object in the default display state, for example.

Also, JP 2009-282827 A discloses a technology for selecting a display frame (display template data) of an optimum size in accordance with the size of a character string as a display object, and displaying the display object in the selected display frame in the default display state.

By such a technology, even when the number of characters in a display object is large, a user can see all the characters in the character string of the display object, and recognize the information indicated by the display object.

By the technology disclosed in JP 2013-12041 A, however, part of the character string of a display object is displayed outside the display frame. Therefore, if there are a large number of display objects overflowing from the respective display frames, many characters are randomly displayed outside the display frames, and it is difficult for users to see the display.

By the technology disclosed in JP 2009-282827, when an enlarged display frame is selected in accordance with the size of a display object, the space for the display frames to display the other display objects cannot be secured. As a result, many display frames cannot be displayed on one operating screen, and not all the display frames to show display objects can be displayed unless the display frames are displayed in a hierarchical manner. This causes a problem of a decrease in the convenience of users.

SUMMARY OF THE INVENTION

Furthermore, the display layout of display frames needs to be changed when the sizes of display frames are changed. Therefore, the costs for development of display designs become higher.

The present invention has been made in view of the above described problems, and an object thereof is to provide a display device that can display characters of a display object, which do not fall within a display frame in a default display state, in a display form that is easy for users to see, without a decrease in the convenience of the users, a display control method, and a non-transitory recording medium storing a computer readable display control program.

To achieve the abovementioned object, according to an aspect, a display device that displays a character string on a display frame in a default display state reflecting one aspect of the present invention comprises: a receiving unit that receives designation of a first display magnification; a magnification changing unit that performs a magnification change process to change display magnifications by setting the display magnification for the display frame at the first display magnification and setting the display magnification for the character string at a second display magnification lower than the first display magnification, when the first display magnification is higher than the display magnification in the default display state; and a display control unit that performs control so that only the characters falling within the display frame having the display magnification changed to the first display magnification are displayed, the only characters being of the character string having the display magnification changed to the second display magnification.

An image forming apparatus according an embodiment of the present invention preferably includes the above described display device.

To achieve the abovementioned object, according to an aspect, a display control method implemented in a display device that displays a character string on a display frame in a default display state reflecting one aspect of the present invention comprises: a receiving step of receiving designation of a first display magnification; a magnification changing step of changing display magnifications by setting the display magnification for the display frame at the first display magnification and setting the display magnification for the character string at a second display magnification lower than the first display magnification, when the first display magnification is higher than the display magnification in the default display state; and a display controlling step of performing control so that only the characters falling within the display frame having the display magnification changed to the first display magnification are displayed, the only characters being of the character string having the display magnification changed to the second display magnification.

To achieve the abovementioned object, according to an aspect, a non-transitory recording medium storing a computer readable display control program to be executed by a computer used in a display device that displays a character string on a display frame in a default display state reflecting one aspect of the present invention causes the computer to carry out: a receiving step of receiving designation of a first display magnification; a magnification changing step of changing display magnifications by setting the display magnification for the display frame at the first display magnification and setting the display magnification for the character string at a second display magnification lower than the first display magnification, when the first display magnification is higher than the display magnification in the default display state; and a display controlling step of performing control so that only the characters falling within the display frame having the display magnification changed to the first display magnification are displayed, the only characters being of the character string having the display magnification changed to the second display magnification.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 shows a specific example of operating screen information;

FIG. 15 shows a modification of the operating screen information shown in FIG. 4;

FIG. 16 is a flowchart showing Modification 2 of the operation in the display magnification change process shown in FIG. 7;

FIG. 17 is a flowchart showing Modification 1 of the operation in the magnification-changed display process shown in FIG. 8;

FIG. 26 shows a specific example of a display target character select table;

FIG. 27 is a flowchart showing Modification 3 of the operation in the magnification-changed display process shown in FIG. 8; and FIG. 28 is a flowchart showing Modification 4 of the operation in the display magnification change process shown in FIG. 7.

DESCRIPTION OF THE PREFERRED EMBODIMENTS

Hereinafter, an embodiment of the present invention will be described with reference to the drawings. However, the scope of the invention is not limited to the illustrated examples.

Embodiment

The following is a description of an example case where an embodiment of a display device in a mode according to the present invention is used in an image forming apparatus.

[1] Image Forming Apparatus

Figure 1:
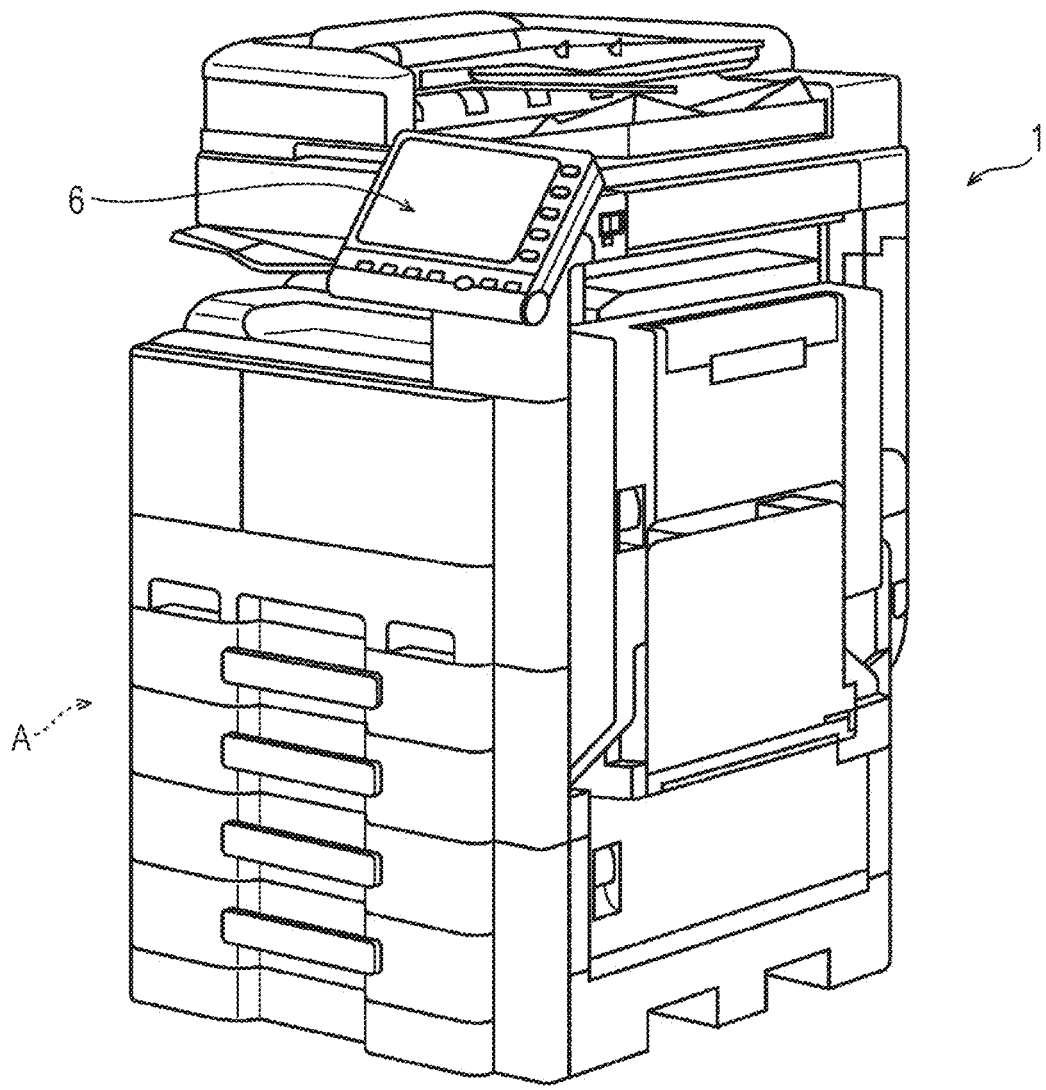
FIG. 1 is a perspective view of a specific example of an image forming apparatus including a display device.

FIG. 1 is a perspective view of a specific example of an image forming apparatus including a display device. In this drawing, reference numeral 1 indicates the image forming apparatus, and reference numeral 6 indicates the display device. As shown in the drawing, the display device 6 is located at an upper portion of the front surface, which is indicated by a dashed arrow A, of the image forming apparatus 1.

Figure 2:
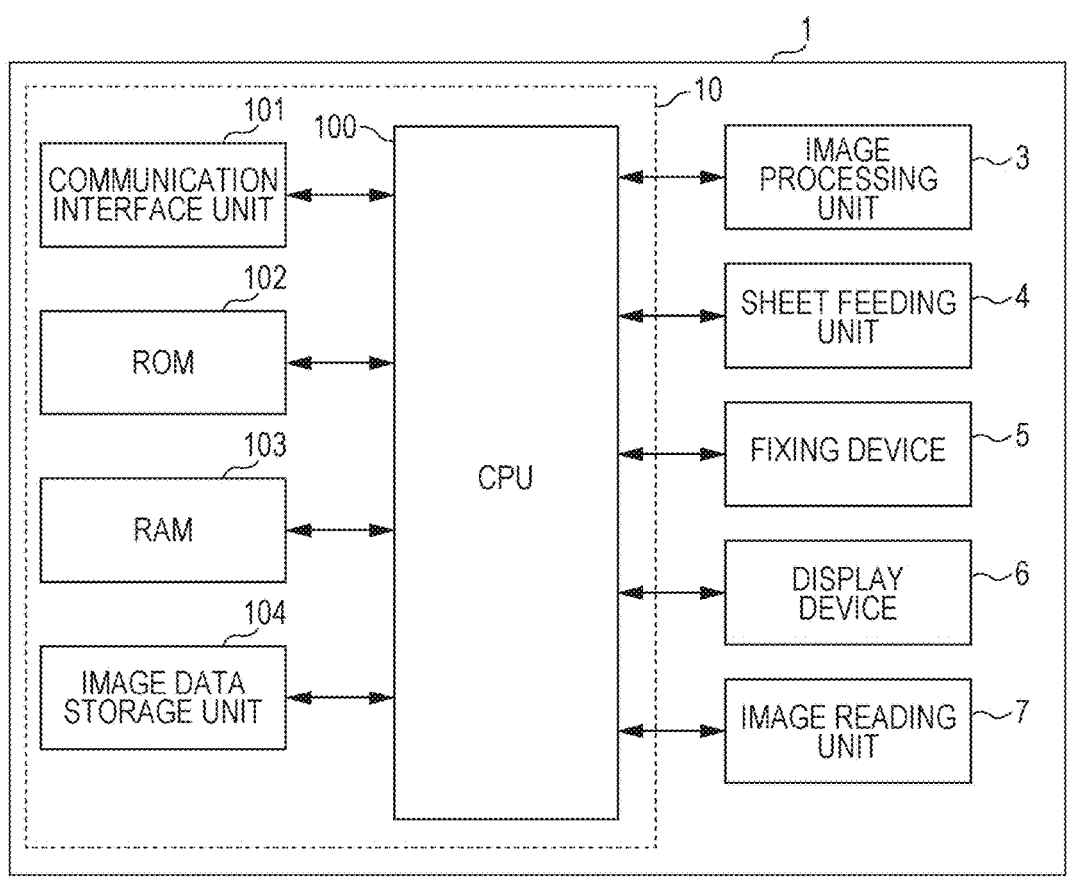
FIG. 2 is a functional block diagram showing the configuration of the image forming apparatus.

FIG. 2 is a functional block diagram showing the configuration of the image forming apparatus 1. The image forming apparatus 1 includes an image processing unit 3, a sheet feeding unit 4, a fixing device 5, the display device 6, an image reading unit 7, and a control unit 10.

The image processing unit 3 is formed with a photosensitive drum, a charger, a developer, an exposing unit, and the like (not shown), and performs a printing job by forming an image on a paper sheet as a recording sheet supplied from the sheet feeding unit 4 based on print image data that is input from the control unit 10 or the image reading unit 7.

The sheet feeding unit 4 supplies a paper sheet as a recording sheet to the image processing unit 3 in accordance with an instruction from the control unit 10. The fixing device 5 thermally fixes an image, which is formed on the paper sheet as a recording sheet, onto the paper sheet in accordance with an instruction from the control unit 10.

Figure 3:
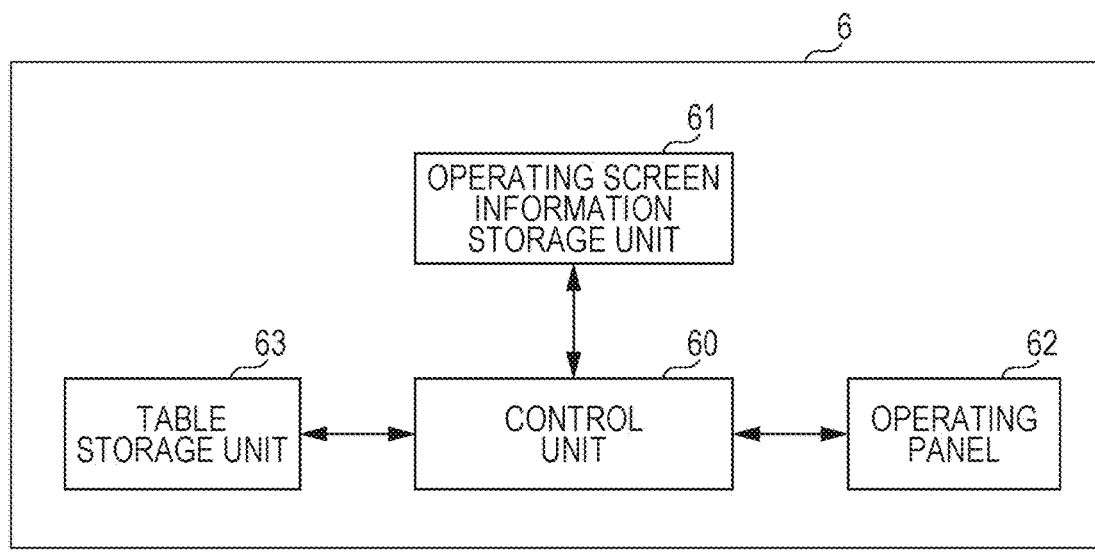
FIG. 3 is a functional block diagram showing the structure of the display device.

FIG. 3 is a functional block diagram showing the structure of the display device 6. The display device 6 includes a control unit 60, an operating screen information storage unit 61, an operating panel 62, and a table storage unit 63. The control unit 60 is formed with a CPU, a ROM, a RAM, and the like, and performs a display control process described later, as well as controlling operation of the entire display device 6. The program for performing the display control process is stored in the ROM, and the control unit 60 executes the program with the CPU, to perform the display control process described later.

The operating screen information storage unit 61 stores operating screen information that is set for each operating screen that can be displayed on the operating panel 62. The operating screen information is associated with operating screen IDs for identifying the respective operating screens. The "operating screen information" is the information about item objects that are display images indicating the contents of respective display items to be displayed on the operating panel 62. Specifically, the "operating screen information" is the information that indicates the correspondence relations among the object IDs for identifying the respective item objects, the display item names of the item objects, the display areas that indicate the display regions of the item objects on the operating panel 62 with ranges of respective coordinate values of the X-coordinate and the Y-coordinate (the ranges from the respective minimum values to the respective maximum values of the X-coordinate and the Y-coordinate), the information about the display objects to be displayed in the display areas of the item objects, and the current non-character display magnification (M) indicating the current display magnification for display objects other than characters among the item objects.

The information about the display objects includes the type of each display object (a type such as text (character string), figure, photograph, or illustration), the display areas that indicate the display regions of the display objects on the operating panels 62 with the ranges of the respective coordinate values of the X-coordinate and the Y-coordinate (the ranges from the minimum coordinate values to the maximum coordinate values of the X-coordinate and the Y-coordinate), the display contents of the display objects, the font of the characters when the current display contents are text, the size of the characters, the character spacing (or the character spacing and the line spacing in a case where the character string is displayed in two or more lines), the current character display magnification (L) indicating the current display magnification for the characters, the total numbers of characters in the respective character strings forming the display objects, the numbers of area displayable characters, the character display rates, and the like.

Here, "the number of area displayable characters" is the maximum number of characters that fall within and can be displayed in the display area of the item object among all the characters of the character string forming the display object, and is calculated based on the font, the size, the spacing (the character spacing and the line spacing) of the characters of the current character string, and the size of the display area of the item object.

A "character display rate" is a percentage figure that indicates the ratio of the number of area displayable characters in the current character string to the total number of characters forming the current character string. Where the "character display rate" is 100%, all the characters forming the character string of the display object fall within and are displayed in the display area of the item object. Where the "character display rate" is less than 100%, the number of constituent characters of the current character string is larger than the number of area displayable characters, and some of the characters forming the current character string do not fall within the display area of the item object and therefore cannot be displayed in the current display area.

The current non-character display magnification (M) and the current character display magnification (L) are set at 100% (the display magnification for same-size display) by default (at the time when operating screen information is acquired in the later described display control process).

That is, the operating screen information storage unit 61 stores the operating screen information by default (at a time of same-size display), and the operating screen information is read into the RAM of the control unit 60 in the display control process, and is updated at a time of magnification.

FIG. 4 shows a specific example of operating screen information. In this operating screen information, information about six item objects with object IDs A000 to A005 are written.

Here, "A000" represents an item object with a display item name "color setting", "A001", "A002", and "A003" represent item objects with a display item name "select key" (the select key of A001 is the "select key for selecting AUTOCOLOR", the select key of A002 is the "select key for selecting FULLCOLOR", and the select key of A003 is the "select key for selecting BLACK&WHITE"), "A004" represents an item object with a display item name "cancel key", and "A005" represents an item object with a display item name "confirmation key".

In the fields of the respective "display areas" of the item objects in the current operating screen information and the display objects of the current item objects, the ranges from the minimum coordinate values to the maximum coordinate values of the X-coordinate and the Y-coordinate are shown. In the two pairs of parentheses shown in each of the "display area" fields, the numerical value on the left side in the left pair of parentheses indicates the minimum value of the X-coordinate, the numerical value on the left side in the right pair of parentheses indicates the maximum value of the X-coordinate, the numerical value on the right side in the left pair of parentheses indicates the minimum value of the Y-coordinate, and the numerical value on the right side in the right pair of parentheses indicates the maximum value of the Y-coordinate.

For example, "(20, 5)-(110, 120)" in the display area field of the item object with the object ID "A000" indicates that the minimum value of the X-coordinate is "20", the maximum value of the X-coordinate is "110", the minimum value of the Y-coordinate is "5", and the maximum value of the Y-coordinate is "120".

Referring back to FIG. 3, the operating panel 62 is formed with a liquid crystal display, a backlight, and the like, and a touch panel is stacked on the surface of the liquid crystal display. The touch panel may be of a projection capacitance type that can simultaneously detect a number of points designated by finger tips or the like of a user, for example.

Under the control of the control unit 60, the operating panel 62 displays various kinds of item objects on the liquid crystal display in accordance with operating screen information. The operating panel 62 receives an instruction from a user by detecting a touch input operation performed by the user on an item object to receive a user instruction, and then outputs the instruction to the control unit 60.

In a case where two points designated by two finger tips of the user are detected on the touch panel, the operating panel 62 outputs the coordinate values of the detected designated points to the control unit 60. Based on the output coordinate values of the designated points, the control unit 60 determines whether the operation performed by the fingertips of the user is a pinching-out operation with the two designated points moving away from each other, or a pinching-in operation with the two designated points moving toward each other.

Figure 5A:
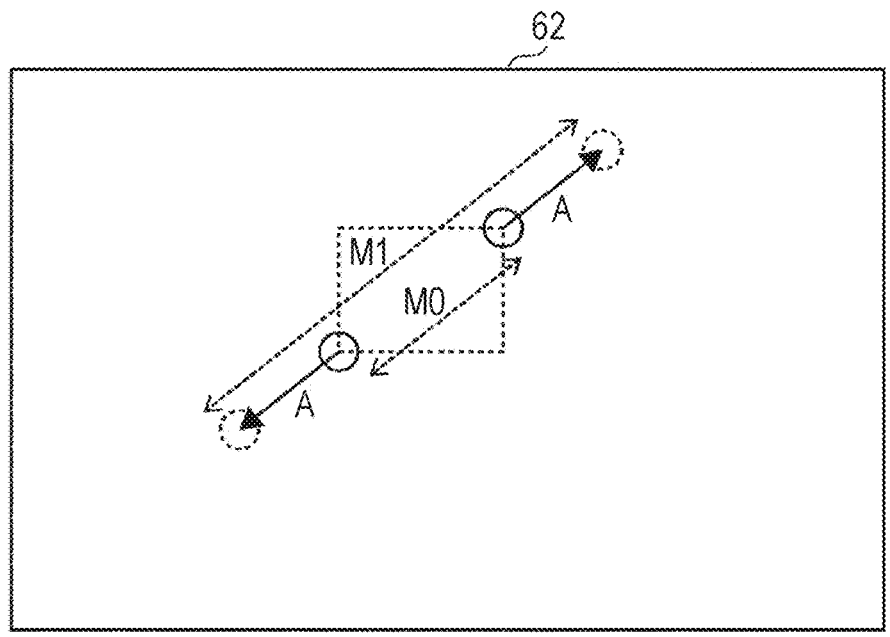
FIGS. 5A and 5B are schematic diagrams showing examples of pinching-in and pinching-out operations.
Figure 5B:
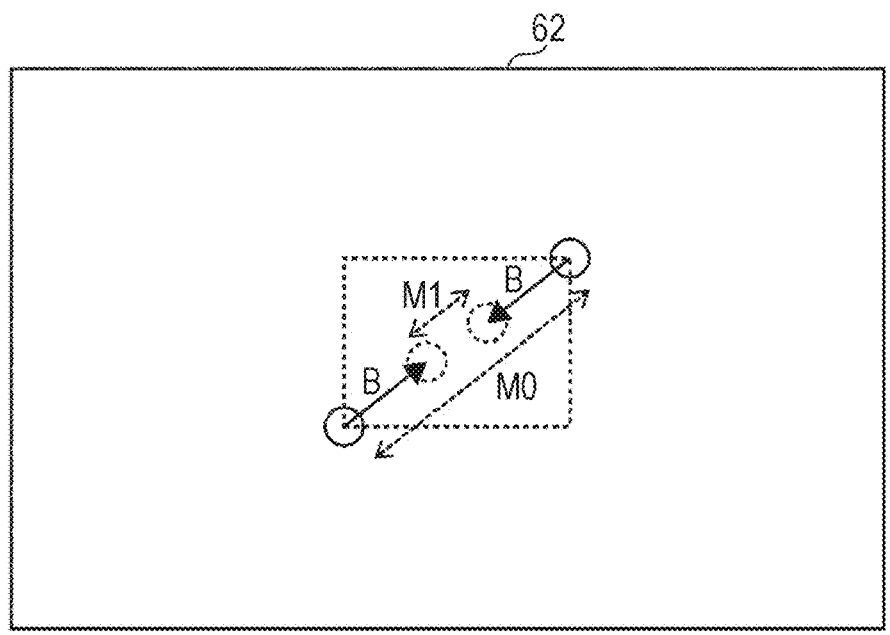

FIG. 5A is a schematic diagram showing an example of a pinching-out operation. FIG. 5B is a schematic diagram showing an example of a pinching-in operation. In each of the drawings, reference numeral 62 indicates the operating panel, the white circles drawn with solid lines indicate the points designated by finger tips of the user prior to movement, the white circles drawn with dashed lines indicate the points designated by the fingertips of the user after movement, and arrows A and B indicate the directions of movement of the finger tips.

In each of the drawings, the upper left corner of the rectangular operating panel 62 is the origin, the direction from the origin toward the right is the positive direction of the X-axis, and the direction from the origin toward the bottom is the positive direction of the Y-axis.

In each of the drawings, a dashed double-headed arrow M0 represents the distance between the points designated by the two finger tips of the user prior to movement, and a dashed double-headed arrow M1 represents the distance between the points designated by the two finger tips of the user after movement. Hereinafter, the absolute value (|M1−M0|) of a difference between M1 and M0 will be referred to as a change in magnification.

Here, a magnification change instruction for an item object is obtained through a pinching-in or pinching-out operation. In a case where the operation performed with finger tips of the user is a pinching-in operation, the control unit 60 determines that the magnification change instruction is a reduction instruction. In a case where the operation performed with finger tips of the user is a pinching-out operation, the control unit 60 determines that the magnification change instruction is an enlargement instruction.

The table storage unit 63 stores an operating screen select table and a magnification change coefficient specifying table. The "operating screen select table" is a table that shows the correspondence relations between item objects and operating screens to which the screen should transit when respective touch inputs for the item objects are accepted, and more specifically, is a table that shows the correspondence relations between the IDs of the item objects and the IDs of the operating screens.

The "magnification change coefficient specifying table" is a table to be used for calculating a designated display magnification (α) in the later described display control process, and is also a table that shows the correspondence relations between changes in magnification and magnification change coefficients.

There are two types of magnification change coefficient specifying tables: a table to be used when the magnification change instruction is an enlargement instruction, and a table to be used when the magnification change instruction is a reduction instruction. When determining that the obtained magnification change instruction is an enlargement instruction, the control unit 60 specifies a magnification change coefficient using the magnification change coefficient specifying table for enlargement instructions. When determining that the obtained magnification change instruction is a reduction instruction, the control unit 60 specifies a magnification change coefficient using the magnification change coefficient specifying table for reduction instructions.

According to the magnification change coefficient specifying table for enlargement instructions, the magnification change coefficient is larger than 1, and the magnification change coefficient becomes larger as the change in magnification becomes larger. According to the magnification change coefficient specifying table for reduction instructions, the magnification change coefficient is smaller than 1, and the magnification change coefficient becomes smaller as the change in magnification becomes larger.

Referring back to FIG. 2, the image reading unit 7 is formed with an image input device such as a scanner (not shown), and generates image data by reading information such as characters or figures shown on a recording sheet such as a paper sheet.

The control unit 10 is a so-called computer, includes a CPU 100, a communication interface unit 101, a ROM 102, a RAM 103, and an image data storage unit 104, and controls operation of the entire image forming apparatus 1.

The communication interface unit 101 is an interface such as a LAN card or a LAN board for connecting to a LAN (Local Area Network). The ROM 102 stores the control program for controlling the image processing unit 3, the sheet feeding unit 4, the fixing device 5, the display device 6, and the image reading unit 7. The RAM 103 is used as the work area when the CPU 100 executes a program. The image data storage unit 104 stores print image data that is input through the communication interface unit 101 or the image reading unit 7.

[2] Display Control Process

Figure 6:
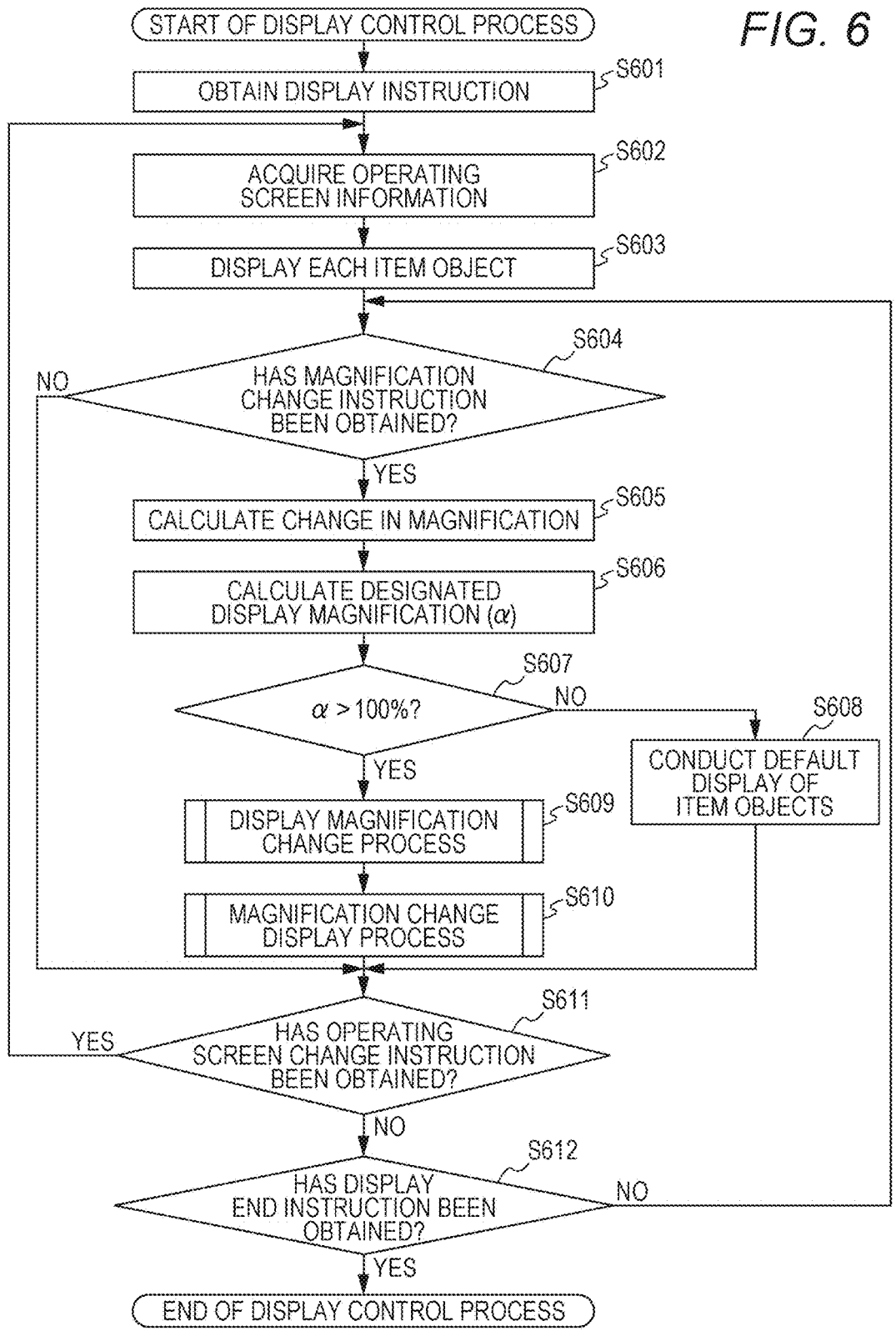
FIG. 6 is a flowchart showing the operation in a display control process to be performed by a control unit.

FIG. 6 is a flowchart showing the operation in the display control process to be performed by the control unit 60. After obtaining an instruction to display an operating screen (step S601), the control unit 60 acquires, from the operating screen information storage unit 61, the operating screen information about the operating screen to be displayed on the operating panel 62 (step S602).

When the power supply is on, the control unit 60 acquires, from the operating screen information storage unit 61, the operating screen information corresponding to the operating screen ID that is set beforehand in the initial screen. If an operating screen change instruction is obtained in step S611, which will be described later, the operating screen information corresponding to the operating screen ID of the operating screen for which the change instruction is issued is acquired from the operating screen information storage unit 61.

The control unit 60 then displays respective item objects on the operating panel 62 based on the obtained operating screen information (step S603). If the control unit 60 obtains a magnification change instruction from a user via the operating panel 62 (step S604: YES), the control unit 60 determines whether the magnification change instruction is an enlargement instruction or whether the magnification change instruction is a reduction instruction based on the coordinate values of respective designated points output from the operating panel 62, and further calculates a change in magnification (|M1−M0|) by calculating the distance (M0) between the two designated points prior to movement and the distance (M1) between the two designated points after the movement (step S605). The control unit 60 obtains from the table storage unit 63 the magnification change coefficient specifying table corresponding to the determined magnification change instruction, specifies the magnification change coefficient corresponding to the calculated change in magnification by referring to the magnification change coefficient specifying table, multiplies the current non-character display magnification indicated in the obtained operating screen information by the specified magnification change coefficient, and calculates the display magnification ($\alpha$) designated by the user through the magnification change instruction (step S606).

If the calculated designated display magnification ($\alpha$) is higher than 100% (step S607: YES), the control unit 60 performs a display magnification change process and a magnification-changed display process described later (steps S609 and S610). If an operating screen change instruction is obtained from the user via the operating panel 62 (if the user selects, on the operating screen displayed on the operating panel 62, an item object that requires display of a different operating screen from the currently displayed operating screen) (step S611: YES), the control unit 60 moves on to the procedure in step S602.

If the result of the determination in step S611 is negative (step S611: NO), and a display end instruction is obtained from the user via the operating panel 62 (step S612: YES), the control unit 60 ends the display control process. If the result of the determination in step S612 is negative (step S612: NO), the control unit 60 moves on to the procedure in step S604.

If the result of the determination in step S604 is negative (step S604: NO), the control unit 60 moves on to the procedure in step S611. If the result of the determination in step S607 is negative (step S607: NO), the control unit 60 conducts default display (same-size display) of the respective item objects on the operating panel 62 based on the operating screen information acquired in step S602 (step S608).

Figure 7:
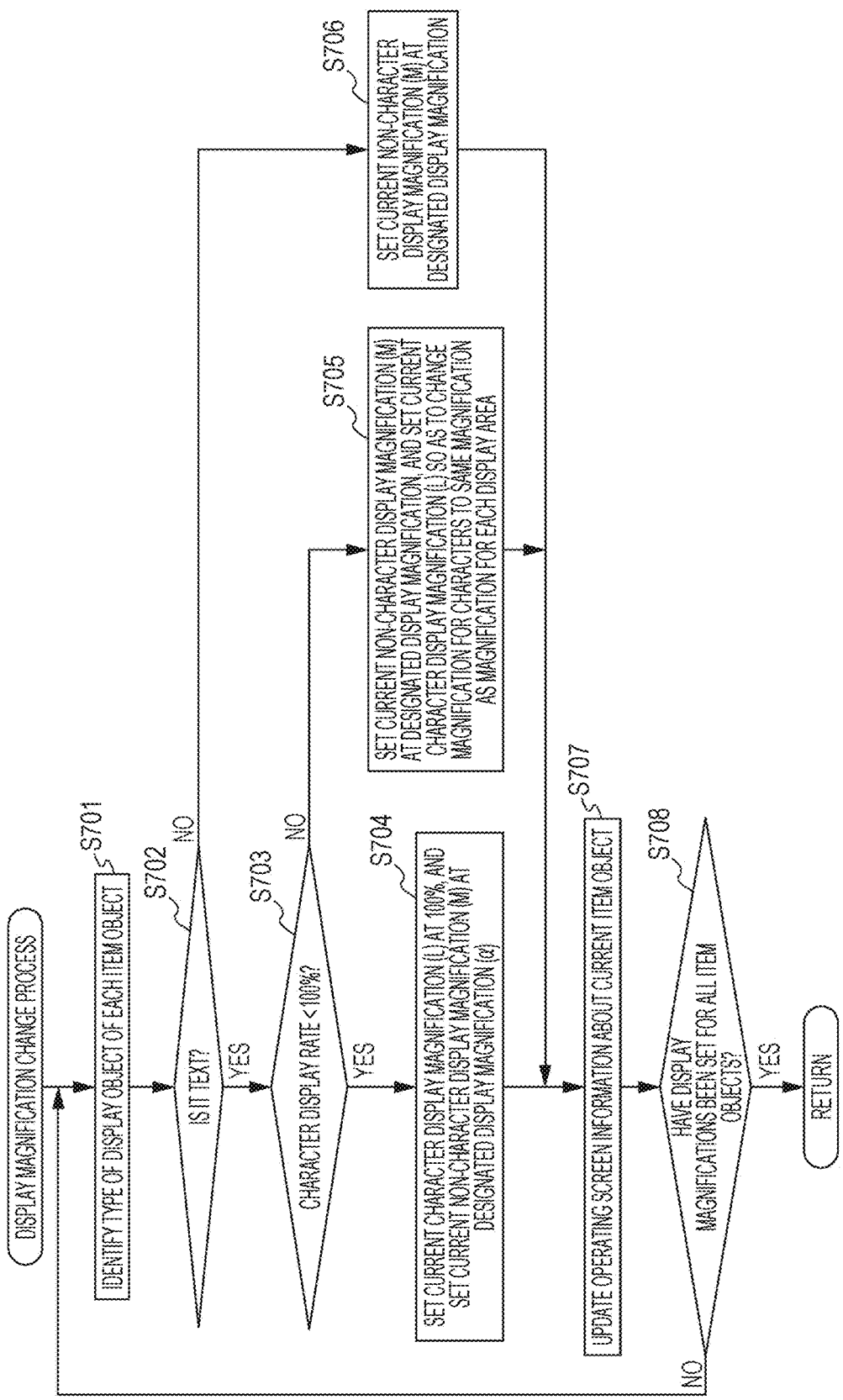
FIG. 7 is a flowchart showing the operation in a display magnification change process to be performed by the control unit.

Next, the display magnification change process is described. FIG. 7 is a flowchart showing the operation in the display magnification change process to be performed by the control unit 60. By referring to the operating screen information acquired when obtaining the magnification change instruction in step S604, the control unit 60 identifies the type of the display object of each of the currently displayed item objects (step S701). If an identified display object is text (step S702: YES), the control unit 60 determines whether the character display rate of the display object is lower than 100% (step S703).

If the result of the determination in step S703 is positive (step S703: YES), the control unit 60 sets the current character display magnification (L) associated with the display object in the operating screen information at 100%, and the current non-character display magnification (M) at the designated display magnification ($\alpha$) (step S704).

Based on the set display magnification, the control unit 60 updates the numerical values in the corresponding fields in the operating screen information about the item object (the respective fields of the display area of the item object, the display area, the number of area displayable characters, and the character display rate of the display object of the item object) (step S707).

Here, the numerical values in the respective display areas are multiplied by the square root of ($\alpha$/M0) and are thus updated (M0 being the current non-character display magnification at the time of acquirement of the magnification change instruction in step S604). The number of area displayable characters and the character display rate are newly calculated based on the uprated values in the respective display areas, and are updated to the calculated values.

If the result of the determination in step S703 is negative (step S703: NO), the control unit 60 sets the current non-character display magnification at the designated display magnification ($\alpha$), and further sets the current character display magnification (L) for the display object at (L0×($\alpha$/M0)) so that the magnification for the characters is changed at the same rate as that for the magnification for the respective display areas of the item object and the display object of the item object (step S705).

Here, L0 and M0 represent the current character display magnification and the current non-character display magnification, respectively, at the time of acquirement of the magnification change instruction in step S604.

After performing the procedure in step S705, the control unit 60 moves on to procedure in step S707. In this case, however, the character display rate prior to the update is 100%, and the magnification for the characters is changed at the same rate as that for the magnification for the respective display areas of the item object and the display object of the item object so that the number of area displayable characters and the character display rate do not change after the update. Accordingly, the number of area displayable characters and the character display rate do not change with a change in magnification, and are not updated.

If the result of the determination in step S702 is negative (step S702: NO), the control unit 60 sets the current non-character display magnification (M) at the designated display magnification ($\alpha$) (step S706), and moves on to procedure in step S707. In this case, the display object is not text, an update process is not performed on the number of area displayable characters and the character display rate.

The control unit 60 repeats the procedures in steps S701 to S707 until display magnifications have been set for all the displayed item objects (step S708: YES).

Figure 8:
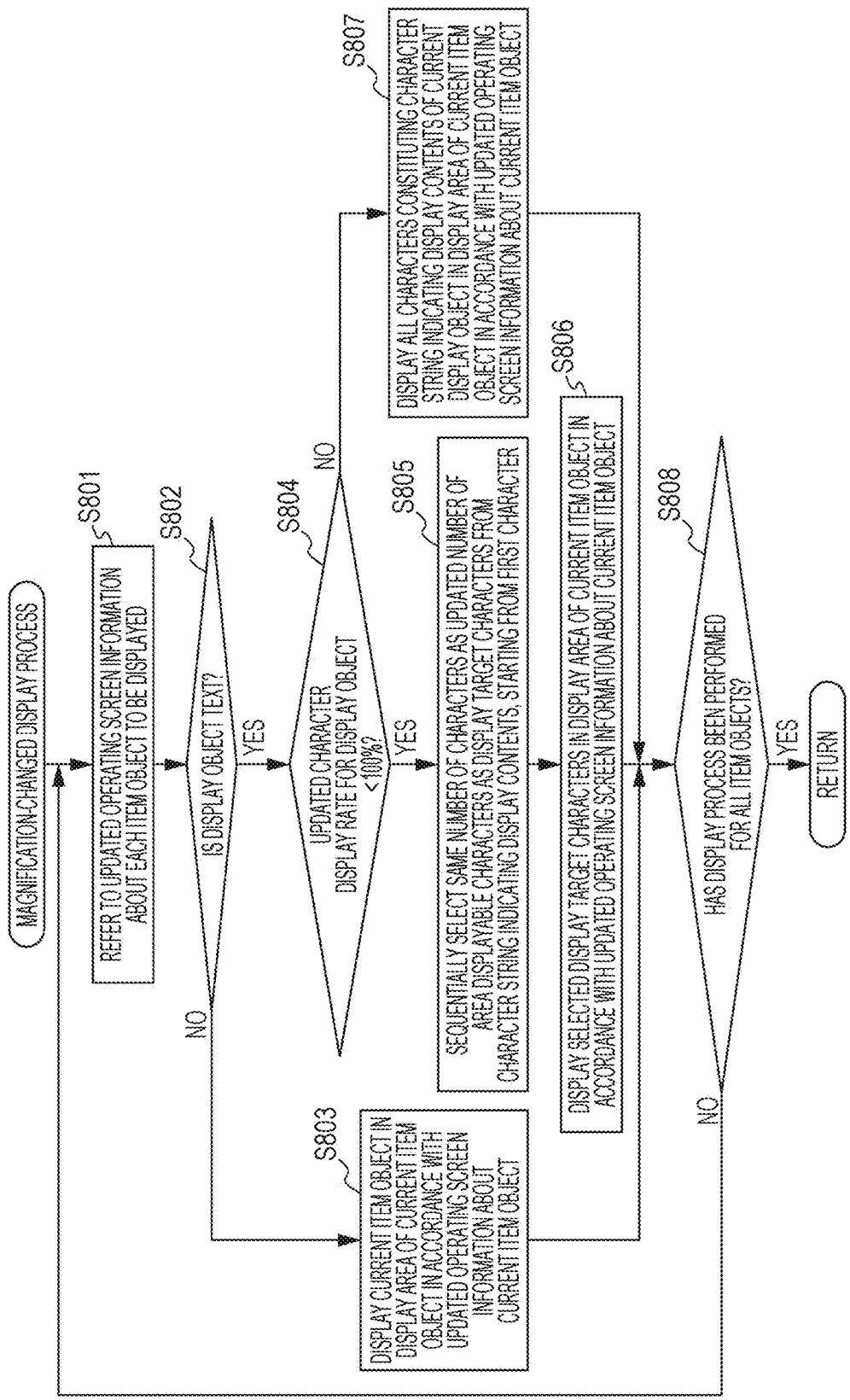
FIG. 8 is a flowchart showing the operation in a magnification-changed display process to be performed by the control unit.

Next, the magnification-changed display process is described. FIG. 8 is a flowchart showing the operation in the magnification-changed display process to be performed by the control unit 60. The control unit 60 refers to the updated operating screen information about each item object to be displayed (step S801). If the display object of the current item object is not text (step S802: NO), the control unit 60 displays the item object in the display area of the item object in accordance with the updated operating screen information about the item object (step S803).

If the result of the determination in step S802 is positive (step S802: YES), and the updated character display rate of the display object is lower than 100% (step S804: YES), the control unit 60 sequentially selects, from the character string indicating the display contents of the display object, the same number of characters as the updated number of area displayable characters as the display target characters, starting from the top of the characters (step S805).

The control unit 60 then displays the selected display target characters in the display areas of the item object and the display object in accordance with the updated operating screen information about the item object (step S806).

As described above, in a case where the updated character display rate is lower than 100%, and the number of the constituent characters of the character string indicating the display contents of the item object is larger than the maximum number of characters that can be displayed in the display area of the item object after a change in magnification, control is performed so that only the characters that can fall within and be displayed in the display area are selected as the display target characters from the character string and are displayed in the display area, and the characters that do not fall within the display area are not displayed.

If the result of the determination in step S802 is positive (step S802: YES), and the result of the determination in step S804 is negative (step S804: NO), the control unit 60 displays all the constituent characters of the character string indicating the display contents of the display object in the display areas of the item object and the display object in accordance with the updated operating screen information about the item object (step S807).

As described above, in a case where the updated character display rate is 100%, and all the constituent characters of the character string indicating the display contents of the item object can be displayed in the display area of the item object after a change in magnification, control is performed so that all the constituent characters of the character string are displayed in the display area.

The control unit 60 repeats the procedures in steps S801 to S807 until the display process has been performed for all the item objects (step S808: YES).

Figure 9:
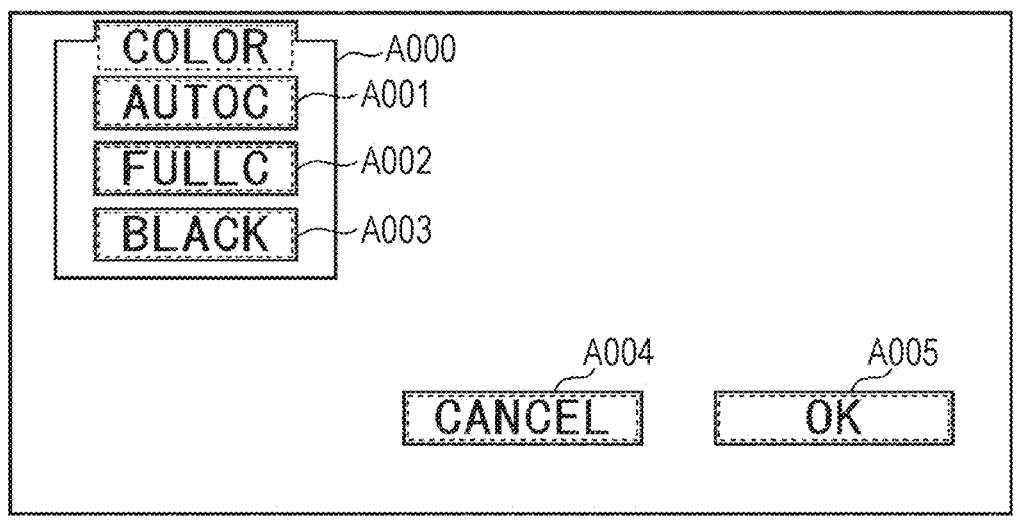
FIG. 9 is a diagram showing an example of default display of an operating screen on an operating panel in accordance with the operating screen information shown in FIG. 4.
Figure 10:
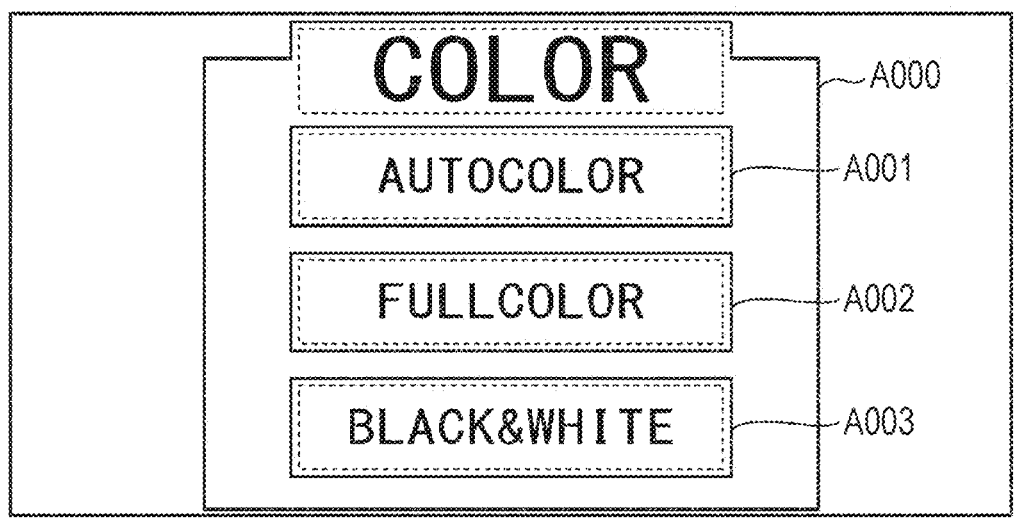
FIG. 10 is a diagram showing an example of an operating screen displayed at a changed magnification through the display control process of this embodiment.
Figure 11:
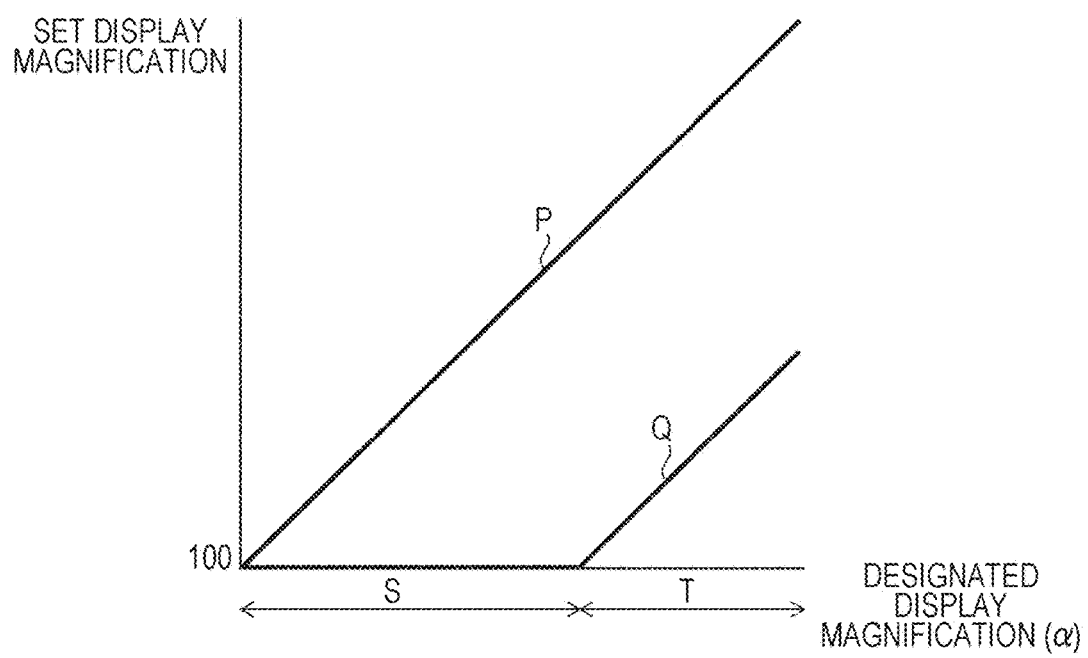
FIG. 11 is a diagram schematically showing the correspondence relation between a designated display magnification ($\alpha$) and the display magnification set for the display area of an item object, and the correspondence relation between the designated display magnification ($\alpha$) and the display magnification set for the characters being displayed in the display area of the item object in the display control process of this embodiment.

FIG. 9 is a diagram showing an example of default display of an operating screen that is displayed on the operating panel 62 in accordance with the operating screen information shown in FIG. 4. FIG. 10 is a diagram showing an example of display of an operating screen displayed at a changed magnification through the display control process of this embodiment. FIG. 11 is a diagram schematically showing the correspondence relation between the designated display magnification ($\alpha$) and the display magnification set for the display area of an item object in the above described display control process, and the correspondence relation between the designated display magnification ($\alpha$) and the display magnification set for the characters being displayed in the display area of the item object in the display control process.

P in FIG. 11 is a graph showing the correspondence relation between the designated display magnification ($\alpha$) and the display magnification set for the display area of an item object, and Q is a graph showing the correspondence relation between the designated display magnification ($\alpha$) and the display magnification set for the characters being displayed in the display area of the item object. Also, S in FIG. 11 represents the range in which the character display rate is lower than 100%, and T represents the range in which the character display rate is 100%.

Referring to FIGS. 9 to 11, the effects of the display control process of this embodiment are described below.

As shown in FIG. 9, six item objects denoted by A000 to A005 are displayed on the operating panel 62. Of the six item objects, the three item objects A001 to A003 have character display rates lower than 100%, and the total number of the constituent characters of the character string indicating the display contents of each of these three item objects is larger than the number of area displayable characters. Therefore, not all the constituent characters of the character strings are displayed in the display areas of these three item objects.

Specifically, in A001, only five characters "AUTOC" of all the nine characters constituting the character string "AUTOCOLOR" are displayed. Likewise, in A002, only five characters "FULLC" of all the nine characters constituting the character string "FULLCOLOR" are displayed. Likewise, in A003, only five characters "BLACK" of all the eleven characters constituting the character string "BLACK&WHITE" are displayed. The rectangles drawn with dashed lines in FIGS. 9 and 10 represent the display areas of the display objects.

When the display magnification change process in the display control process of this embodiment is performed, a magnification change process is performed on the three item objects A001 to A003 so that the display magnification for the display areas of the item objects becomes higher than the display magnification (100%) for the characters being displayed in the display areas, as indicated by the graphs P and Q in the range S in FIG. 11. In the display areas after the magnification change process, the display spaces for the characters are relatively enlarged by the amount equivalent to the difference between the two display magnifications. As a result, a larger number of characters than that in the default display can be displayed in the display area of each of the three item objects.

Furthermore, as indicated by the graphs P and Q in the range S in FIG. 11, the display magnification for the characters is fixed at 100% (same-size display) before the character display rate reaches 100%. Therefore, as the designated display magnification ($\alpha$) becomes higher, the difference in display magnification between the two (the graph P and the graph Q) becomes wider. Accordingly, the number of characters that can be displayed in the display area of each of the item objects can be increased by increasing the display magnification ($\alpha$) to be designated through a magnification change instruction. As shown in FIG. 10, for the three item objects A001 to A003, all the constituent characters of the character strings indicating the display contents can eventually be displayed in the display areas of the respective item objects.

In FIG. 10, for the three item objects A001 to A003, the number of characters that can be displayed in the display area of each of the item objects is made larger than that shown in FIG. 9 by the amount equivalent to the difference in display magnification between the two, and all the constituent characters of the respective character strings are eventually displayed in the display areas.

Specifically, in A001, all the nine characters constituting the character string "AUTOCOLOR" are displayed. Likewise, in A002, all the nine characters constituting the character string "FULLCOLOR" are displayed. Likewise, in A003, all the eleven characters constituting the character string "BLACK&WHITE" are displayed.

As described above, in the display control process of this embodiment, when a higher display magnification than that in default display (the display magnification: 100%) is accepted through a magnification change instruction, the display magnification for the characters to be displayed in the display area of an item object is set at a lower display magnification than the designated display magnification ($\alpha$), and the display space for the characters is relatively enlarged by the amount equivalent to the difference between the two display magnifications in the display area having its magnification changed to the designated display magnification ($\alpha$). Accordingly, a larger number of characters than that in the default display can be displayed in the display area having its magnification changed to the designated display magnification (α).

As a result, even when there are characters that cannot be displayed in the display frame (display area) of an item object at the time of default display, the magnification for the display of the operating screen is changed so that the characters that cannot be displayed in the display frame at the time of default display can be displayed in the display frame after the magnification change. Accordingly, characters that cannot be displayed at the time of default display can be displayed in a display form that is easy for the user to view, without a decrease in convenience of the user.

Furthermore, as indicated by the graphs P and Q in the range S in FIG. 11, the difference between the two display magnifications becomes wider as the designated display magnification (α) becomes higher, before the character display rate reaches 100%. Accordingly, the number of characters that can be displayed in the display area of each item object can be increased by increasing the display magnification (α) to be designated through a magnification change instruction. Thus, a user can certainly check the display contents of the item objects by increasing the display magnification (α) to be designated through a magnification change instruction so that all the constituent characters of the item objects not displayed in the display areas at the time of default display are eventually displayed.

Also, when the character display rate reaches 100%, the magnifications for the characters and the display area of the item object in which the characters are displayed are changed at the same rate, as indicated by the graphs P and Q in the range T in FIG. 11. Accordingly, characters can be displayed at a higher magnification, and the display contents of the item object can be made easier to see.

(Modifications)

Although an embodiment of the present invention has been described so far, the present invention is of course not limited to the above described embodiment, and may be embodied in the modifications described below.

(1) In the above embodiment, when the character display rate is lower than 100% in the display control process, the display magnification for characters at the time of a magnification change is fixed at 100%, and the display magnification for characters is not changed. However, the display magnification for characters may be set at a lower display magnification than the display magnification for the display areas of item objects, and may not be a fixed value as in the above embodiment. For example, the display magnification for characters at a time of magnification change may be set at a value that is calculated by multiplying the display magnification for the display area of the item object displaying the characters by a predetermined coefficient value k that is greater than 0 but smaller than 1.

Specifically, in the procedure in step S704 of the display magnification change process shown in FIG. 7, the current character display magnification (L) may be set at kα (0<k<1), instead of 100%.

Figure 12:
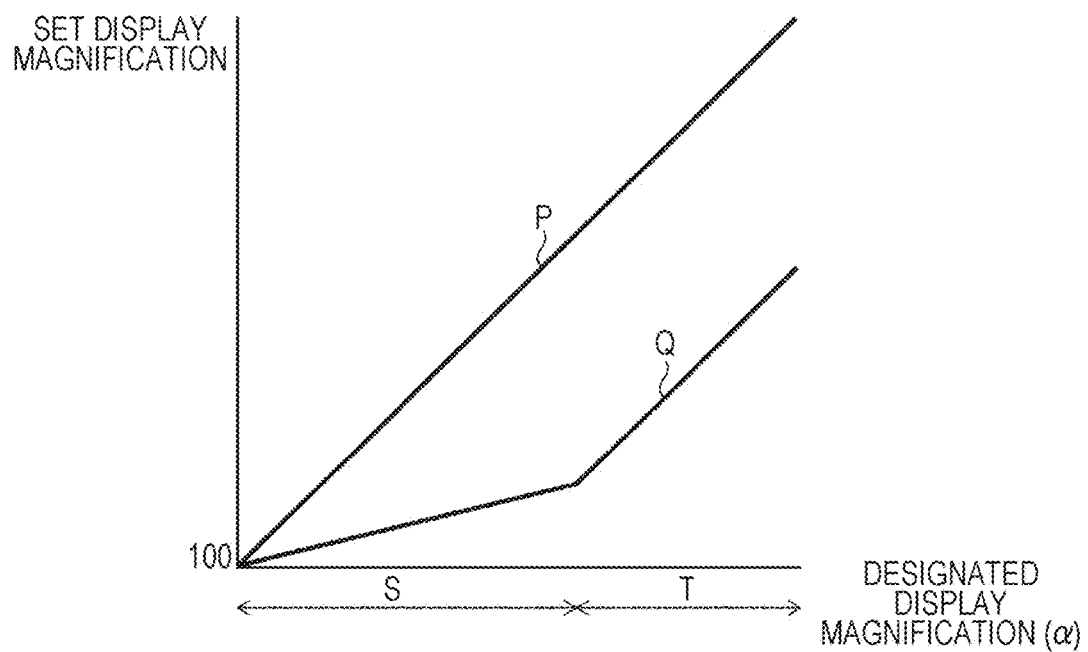
FIG. 12 is a diagram schematically showing the correspondence relation between the designated display magnification ($\alpha$) and the display magnification set for the display area of an item object, and the correspondence relation between the designated display magnification ($\alpha$) and the display magnification set for the characters being displayed in the display area of the item object in a modification of FIG. 11.

FIG. 12 is a diagram schematically showing the correspondence relation between the designated display magnification (α) and the display magnification set for the display area of an item object in this modification, and the correspondence relation between the designated display magnification (α) and the display magnification set for the characters being displayed in the display area of the item object in this modification. The respective alphabets shown in FIG. 12 means the same as those shown in FIG. 11, and therefore, explanation of them is not repeated herein.

As shown in FIG. 12, in this modification, the display magnification set for the display area of an item object is higher than the display magnification set for characters in the range S in which the character display rate is lower than 100%, and the difference between the two display magnifications becomes wider as the designated display magnification (α) becomes higher, as in the above embodiment. Accordingly, the same effects as those of the above embodiment can be achieved.

(2) In the display control process of the above embodiment, the display magnification to be set for characters is changed depending on whether the character display rate at the time of a magnification change is lower than 100%. However, even in a case where the character display rate has reached 100%, it is possible to set the same display magnification as that in a case where the character display rate is lower than 100%.

Specifically, in the display magnification change process shown in FIG. 7, the procedures in step S703 and step S705 may be deleted. The same setting may be applied in the modification described in (1).

(3) In the display control process of the above embodiment, where the character display rate is lower than 100%, the display magnification for characters at the time of a magnification change is fixed at 100%, regardless of the magnitude of the character display rate. However, the display magnification for characters at the time of a magnification change may be set so that the difference between the display magnification (=the designated display magnification (α)) for the display area of the item object and the display magnification for characters becomes larger as the character display rate becomes lower.

For example, where the character display rate is A %, the display magnification (Y) for the characters at the time of a magnification change may be set according to the equation shown below.

$$Y = A/100 \times \alpha$$

Figure 13:
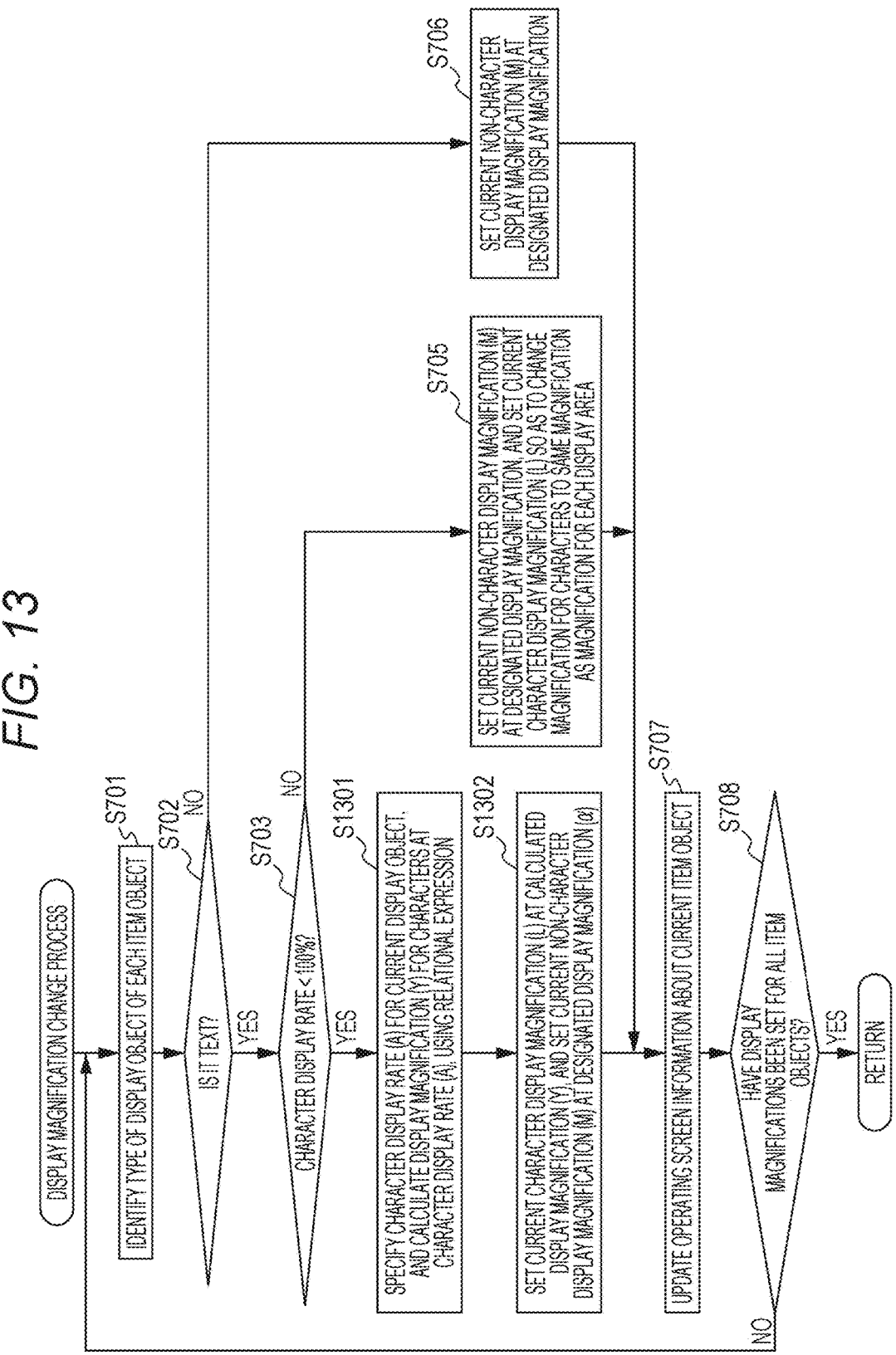
FIG. 13 is a flowchart showing Modification 1 of the operation in the display magnification change process shown in FIG. 7.

Specifically, the above relational expression may be stored beforehand in the table storage unit 63, and the display magnification change process shown in FIG. 7 may be modified as shown in FIG. 13. In the modification (Modification 1) shown in FIG. 13, the procedures with the same processing contents as the corresponding procedures in FIG. 7 are denoted by the same step numbers as those in FIG. 7, and explanation of those processing contents is not repeated herein. Only the different aspects from the processing contents shown in FIG. 7 are described below.

If the result of the determination in step S703 is positive (step S703: YES), the control unit 60 specifies the character display rate (A) for the current display object, and calculates the display magnification (Y) for the characters at the character display rate, using the relational expression stored in the table storage unit 63 (step S1301). The control unit 60 then sets the current character display magnification (L) for the current display object in the operating screen information at the calculated display magnification (Y), and the current non-character display magnification (M) at the designated display magnification (α) (step S1302).

Figure 14:
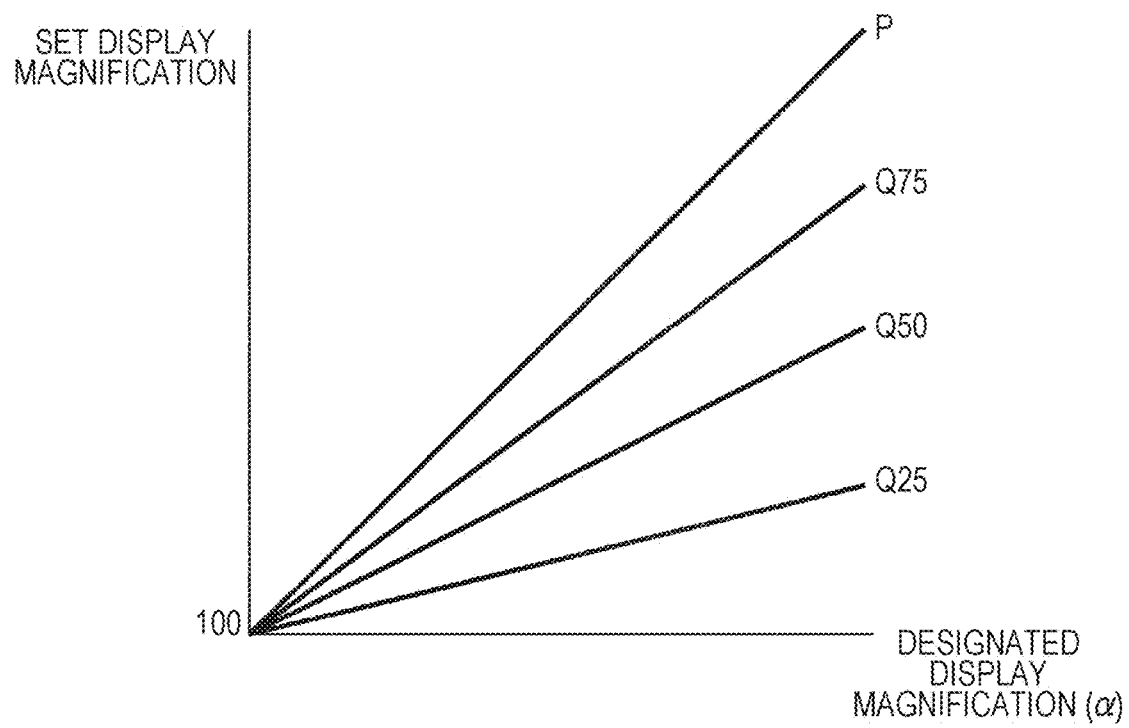
FIG. 14 is a diagram schematically showing the correspondence relation between the designated display magnification ($\alpha$) and the display magnification set for the display area of an item object, and the correspondence relations between the designated display magnification ($\alpha$) and the display magnification set for the characters being displayed in the display area of the item object at respective character display rates.

FIG. 14 is a diagram schematically showing the correspondence relation between the designated display magnification (α) and the display magnification set for the display area of an item object, and the correspondence relations between the designated display magnification (α) and the display magnification set for the characters being displayed in the display area of the item object at respective character display rates.

P in FIG. 14 is a graph showing the correspondence relation between the designated display magnification (α) and the display magnification set for the display area of an item object, and Q75, Q50, and Q25 are graphs showing the correspondence relations between the designated display magnification (α) and the display magnification set for the characters being displayed in the display area of the item object at character display rates of 75%, 50%, and 25%, respectively.

As shown in FIG. 14, in a case where the display magnification for characters at the time of a magnification change is set according to the above relational expression, the difference between the display magnification set for the display area of an item object and the display magnification set for characters can be made wider as the character display rate becomes lower. Accordingly, even in a case where a large number of characters are not displayed in the display area of an item object, the user can make a large number of undisplayed characters displayed in the display area after the magnification change. Thus, convenience of the user can be further increased in the display contents checking operation.

This modification can also be applied in the modification described in (2).

(4) In the above embodiment, the magnification-changed display process is performed in the display control process, so that the characters not displayed in the display area of an item object at the time of default display are selected in order of the arrangement sequence in the character string, and are displayed in the display area after a magnification change. However, the character string may be divided into character groups, and the character groups may be sequentially selected and be displayed.

In a case where the character string is formed with two or more words, for example, each one word in the character string may form a character group. This is because, when the number of characters displayed in the display area of an item object after a magnification change is less than the total number of the constituent characters of the character string, the user can recognize the entire display contents more quickly in a case where some of the characters forming each word are displayed than in a case where some of the characters constituting the character string are displayed in order of the arrangement sequence of the character string.

For example, in a case where all the characters in the word at the top of the sequence of the words constituting a character string are displayed, but all the characters in the words at the end of the sequence of the character string are not displayed, it is difficult for the user to recognize the entire display contents. In a case where some of the characters of each of the words constituting the character string are evenly displayed, on the other hand, it is easy for the user to recognize the word promptly from the displayed characters.

Specifically, the structure of the operating screen information shown in FIG. 4 may be modified to be a structure in which the display object of each item object is divided into words as shown in FIG. 15, and the display magnification change process shown in FIG. 7 and the magnification-changed display process shown in FIG. 8 may be modified as shown in FIGS. 16 and 17, respectively.

In FIGS. 16 and 17, the procedures with the same processing contents as the corresponding procedures in FIGS. 7 and 8 are denoted by the same step numbers allotted to the corresponding procedures in FIGS. 7 and 8, and explanation of those processing contents is not repeated herein. Only the different aspects are described below.

In Modification 2 of FIG. 7 shown in FIG. 16, after carrying out the procedure in step S702, the control unit 60 determines whether there is more than one display object in the current item object (step S1601). If there is more than one display object (step S1601: YES), the control unit 60 calculates the mean value of the character display rates among the display objects, and sets the calculated mean value as the character display rate to be used in the determination in step S703 (step S1602).

If the result of the determination in step S1601 is negative (step S1601: NO), the control unit 60 moves on to the procedure in step S703.

In Modification 1 of FIG. 8 shown in FIG. 17, after carrying out the procedure in step S806 or S807, the control unit 60 determines whether the display process has been performed on all the display objects in the current item object (step S1701). If the display process has been performed on all the display objects in the current item object (step S1701: YES), the control unit 60 moves on to the procedure in step S808. If the display process has not been performed on all the display objects in the current item object (step S1701: NO), the control unit 60 moves on to the procedure in step S804.

Figure 18:
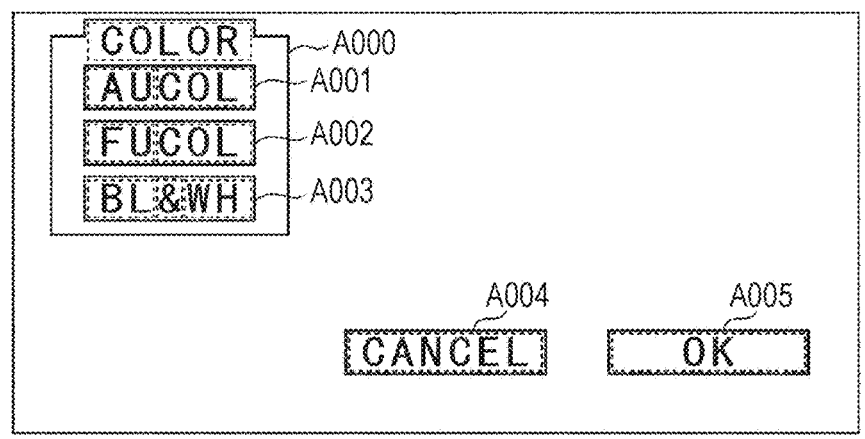
FIG. 18 is a diagram showing an example of default display of an operating screen on the operating panel in accordance with the operating screen information shown in FIG. 15.

FIG. 18 is a diagram showing an example of default display of an operating screen, and is an example of an operating screen displayed on the operating panel 62 in accordance with the operating screen information shown in FIG. 15.

As shown in FIG. 18, six item objects denoted by A000 to A005 are displayed on the operating panel 62. Of the six item objects, each of the three items A001 to A003 is formed with two or more divided display objects.

Specifically, the character string A001 indicating display contents is formed with divisional display objects formed with two words "AUTO" and "COLOR". Of all the constituent characters of the respective words, the characters ("AU" and "COL") equivalent to the numbers of area displayable characters of the divisional display objects are displayed in the respective display areas of the divisional display objects.

Likewise, the display string A002 indicating the display contents is formed with divisional display objects formed with two words "FULL" and "COLOR". Of all the constituent characters of the respective words, the characters ("FU" and "COL") equivalent to the numbers of area displayable characters of the divisional display objects are displayed in the respective display areas of the divisional display objects.

Likewise, the character string A003 indicating display contents is formed with divisional display objects formed with three words "BLACK", "&", and "WHITE" ("&" is formed with one character but is regarded as a word, because it has the same meaning as the English word "and"). Of all the constituent characters of the respective words, the characters ("BL", "&", and "WH") equivalent to the numbers of area displayable characters of the divisional display objects are displayed in the respective display areas of the divisional display objects. The rectangles drawn with dashed lines in FIG. 18 represent the display areas of the display objects. The same applies to FIGS. 19 and 20, which will be described later.

When the display magnification change process shown in FIG. 16 is performed, a magnification change process is performed so that the display magnification (α) for the display areas of the divisional display objects among the three item objects A001 to A003 becomes higher than the display magnification (100%) for the characters being displayed in the display areas. In the display areas after the magnification change process, the display spaces for the characters are relatively enlarged by the amount equivalent to the difference between the two display magnifications. As a result, an increased number of characters can be displayed for each of the words constituting the character string indicating the display contents of each item object.

Figure 19:
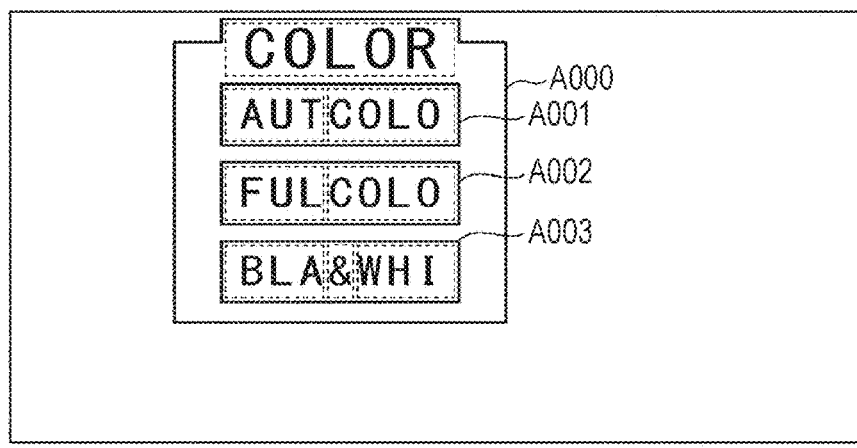
FIG. 19 is a diagram showing an example of display after a magnification change is performed on the operating screen shown in FIG. 18.
Figure 20:
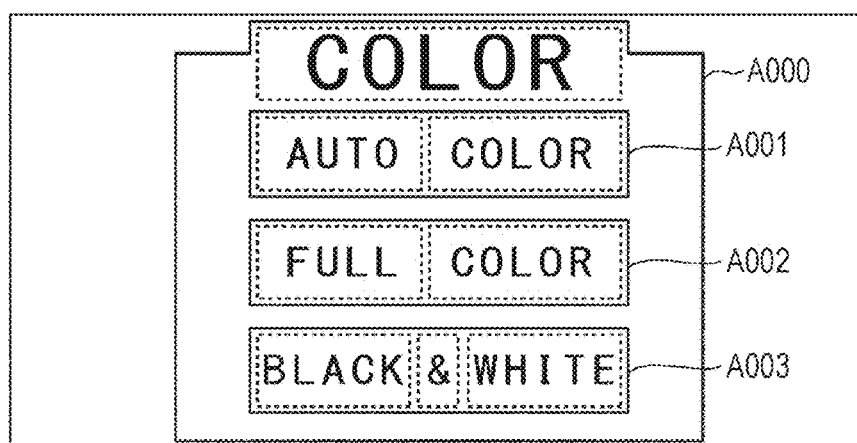
FIG. 20 is a diagram showing another example of display after a magnification change is performed on the operating screen shown in FIG. 18.

FIGS. 19 and 20 are diagrams showing situations where the magnification for display of the operating screen shown in FIG. 18 is changed by gradually increasing the designated display magnification (α), and becomes gradually higher until all the characters constituting the respective words not displayed in the display areas of the divisional display objects at the time of default display are displayed during the display control process of this modification. The respective alphabets in FIGS. 19 and 20 have the same meanings as those in FIG. 18.

As described above, in the display control process of this modification, display is controlled so as to change the numbers of characters constituting the respective words constituting the character string indicating the display contents of an item object. Accordingly, it is easier to recognize the display contents of an entire character string in a case where the number of characters displayed in the display area of an item object after a magnification change has not reached the total number of constituent characters of the character string than in the display control process of the above embodiment.

For example, in the display control process of the above embodiment, only the characters constituting one word "BLACK" are displayed among the three words constituting the character string "BLACK&WHITE" indicating the display contents of A003 (see FIG. 9) in the default display state, and the other two words are not displayed in the display area of A003 unless the designated display magnification (α) is increased to a certain level. Therefore, it is difficult to recognize the contents of the character string.

In the display control process of this modification, on the other hand, at least one of the characters of each of the three words is already displayed in the display area of A003 in the default display state. Accordingly, the user can see at least one of the characters of each of the words included in the character string at the time of default display, and can easily associate the respective words included in the character string with these partial words. As a result, it is easy to tell the display contents of the entire character string, and the respective words included in the character string can be determined without a large increase in the designated display magnification (α) (or a large increase in the number of characters in the display area). Accordingly, the display contents of the entire character string can be readily recognized.

This modification can also be applied in the modifications described in (1) to (3).

(5) In the above embodiment, in a case where the character display rate is lower than 100%, a process is performed so that the display magnification for characters at the time of a magnification change becomes lower than the designated display magnification. However, an application range of item objects on which the process is to be performed may be designated, and the process may be performed only on the characters of the item objects displayed in the designated application range.

Figure 21:
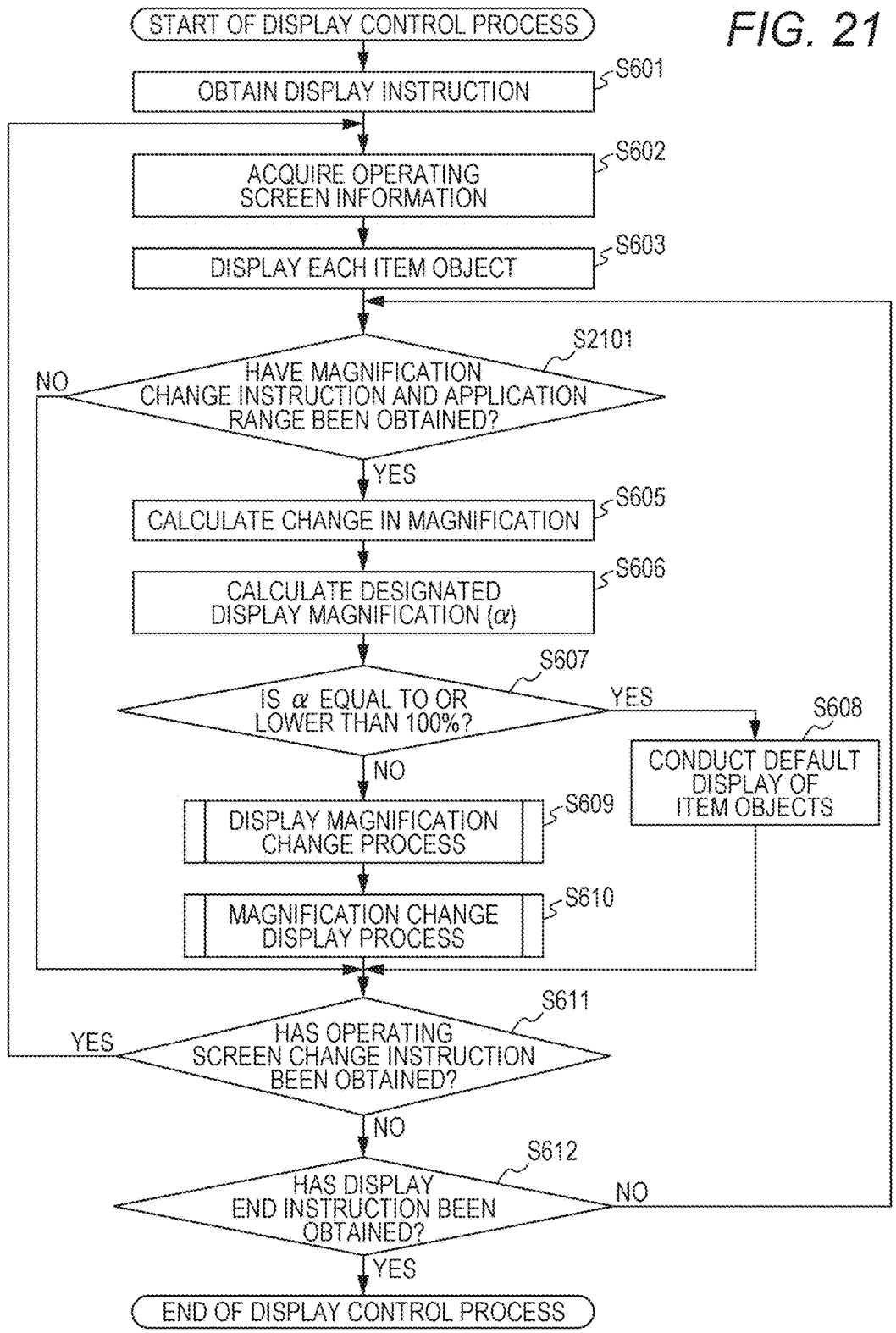
FIG. 21 is a flowchart showing a modification of the operation in the display control process shown in FIG. 6.
Figure 22:
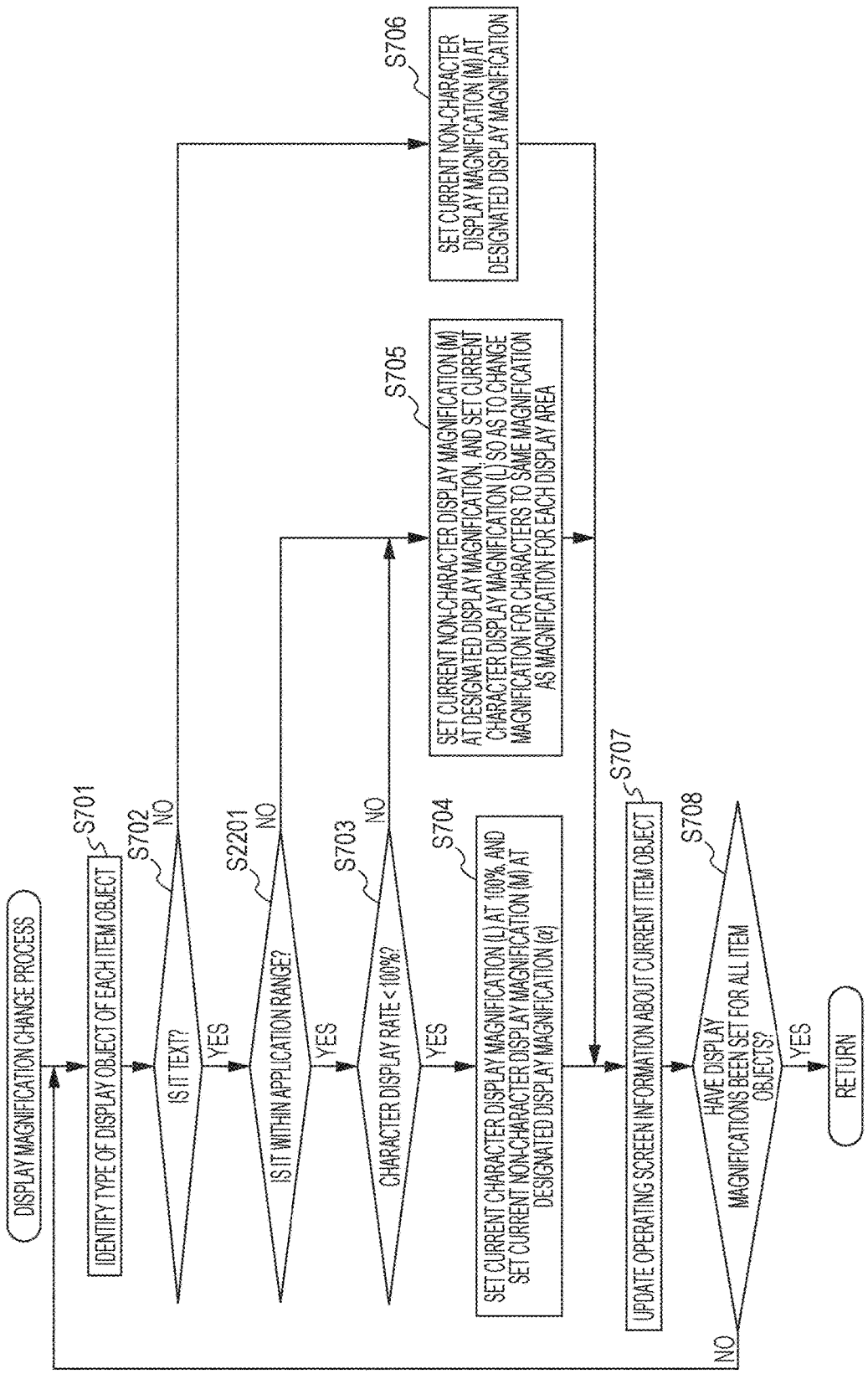
FIG. 22 is a flowchart showing Modification 3 of the operation in the display magnification change process shown in FIG. 7.

Specifically, the display control process shown in FIG. 6 and the display magnification change process shown in FIG. 7 may be modified as shown in FIGS. 21 and 22, respectively. In FIGS. 21 and 22, the procedures with the same processing contents as the corresponding procedures in FIGS. 6 and 7 are denoted by the same step numbers as those in FIGS. 6 and 7, and explanation of those processing contents is not repeated herein. Only the different aspects are described below.

In the modification of FIG. 6 shown in FIG. 21, after carrying out the procedure in step S603, the control unit 60 moves on to the procedure in step S605 if the control unit 60 receives a magnification change instruction and application range designation from the user (step S2101: YES).

Here, the application range designation is designation of a range indicated by the positions of two finger tips in the X-coordinate and the Y-coordinate prior to movement in a pinching-in or pinching-out operation by the user. That is, a range within the rectangle drawn with a dashed line in FIG. 5A or 5B is designated as an application range.

In Modification 3 of FIG. 7 shown in FIG. 22, if the result of the determination in step S702 is positive (step S702: YES), the control unit 60 determines whether the current item object is displayed within the application range designated in step S2101 (step S2201). If the current item object is displayed within the application range (step S2201: YES), the control unit 60 moves on to the procedure in step S703. If the current item object is not displayed within the application range (step S2201: NO), the control unit 60 moves on to the procedure in step S705.

By this operation, the user can select only the item object whose display contents the user wishes to check, and then check the display contents.

Figure 23:
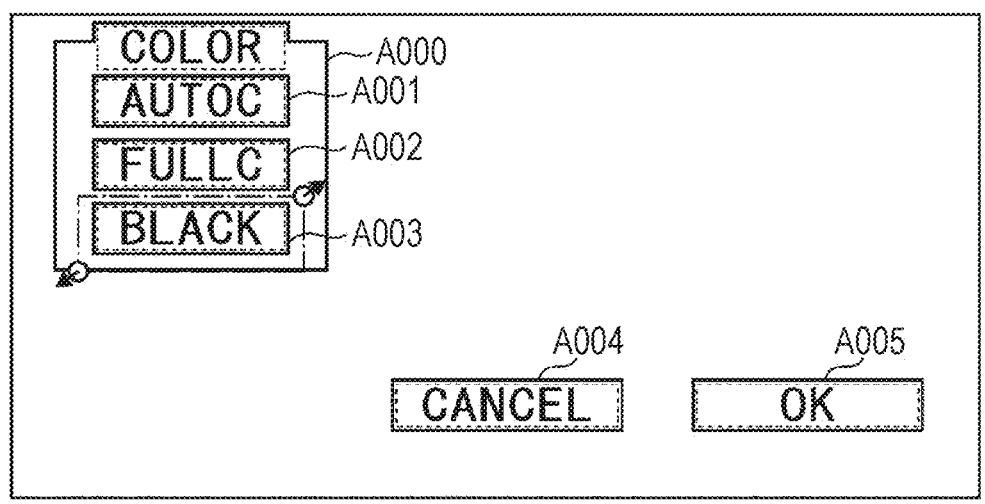
FIG. 23 shows an example of default display of an operating screen in a case where an application range is designated through a pinching-out operation.
Figure 24:
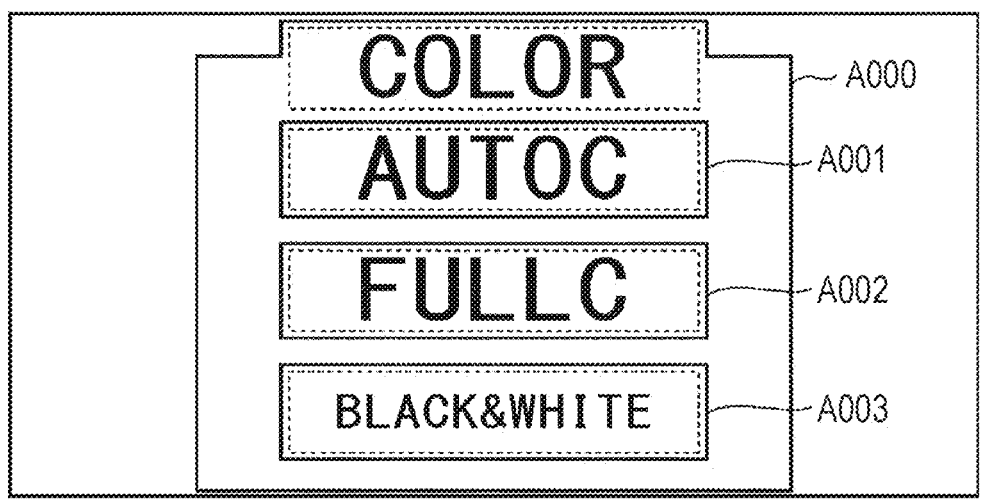
FIG. 24 is a diagram showing an example of display after a magnification change is performed on the operating screen shown in FIG. 23.

In a case where the user designates the rectangle drawn with a dot-and-dash line as the application range (or designates the item object A003 as the application range) through a pinching-out operation as indicated by white circles and arrows in FIG. 23, for example, the process of making the display magnification for characters at the time of magnification change lower than the designated display magnification is performed only in the display area of the item object A003 as shown in FIG. 24, and the number of characters displayed in the display area is made larger than that in the case shown in FIG. 23.

FIG. 23 shows an example of default display of an operating screen like FIG. 10, and FIG. 24 is an example of display of the operating screen shown in FIG. 23 after a magnification change through the display control process of this modification.

This modification can also be applied in the modifications described in (1) to (4).

(6) In the above embodiment, if the character display rate is lower than 100% in the display control process, the constituent characters of the character string indicating the display contents of the item object are displayed in order of the arrangement sequence in the character string within the number of area displayable characters. However, constituent characters that are selected beforehand from the character string may be displayed within the number of area displayable characters in accordance with the designated display magnification (α), regardless of the arrangement sequence.

Figure 25:
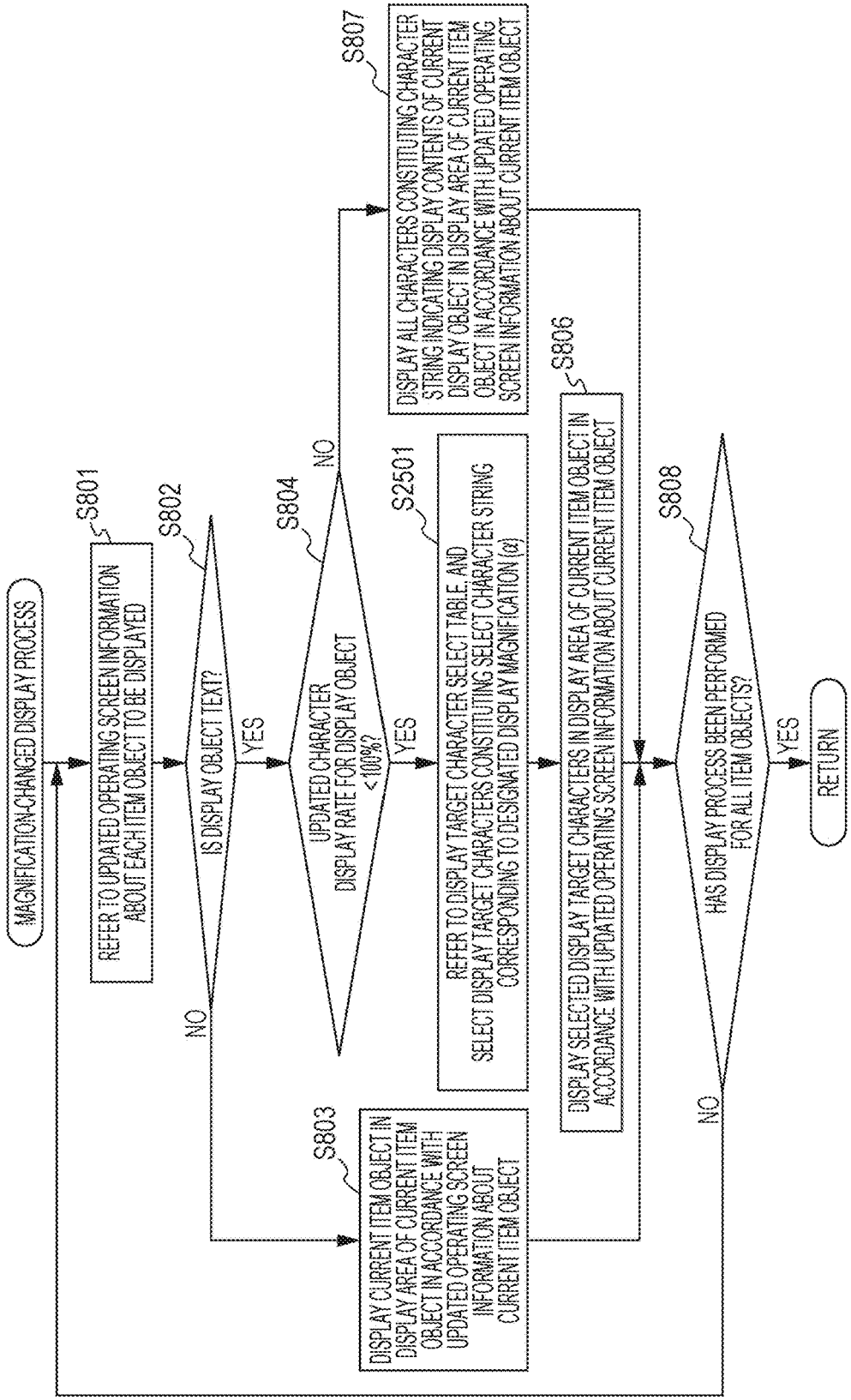
FIG. 25 is a flowchart showing Modification 2 of the operation in the magnification-changed display process shown in FIG. 8.

Specifically, a display target character select table showing the correspondence relation between the display magnification (α) and a select character string (a character string formed with constituent characters selected from among the characters constituting the character string indicating the display contents of the current item object) formed with characters in the number of area displayable characters (the number of area displayable characters when the display magnification for characters is 100%) at the designated display magnification (α) may be stored for each item object in the table storage unit 63, and the magnification-changed display process shown in FIG. 8 may be modified as shown in FIG. 25.

FIG. 26 shows a specific example of a display target character select table. In FIG. 26, the display target character select table with an item object ID "A003" is shown. For ease of explanation, this modification is based on the assumption that "BW" is displayed in the display frame of the item object A003 at the time of default display.

The character string indicating the display contents of the current item object is "BLACK&WHITE". In the display target character select table, abbreviations for the sub character strings "BLACK" and "WHITE", which constitute the character string indicating the display contents, are set as select character strings.

In Modification 2 of FIG. 8 shown in FIG. 25, if the result of the determination in step S804 is positive (step S804: YES), the control unit 60 refers to the display target character select table of the current item object stored in the table storage unit 63, and selects the select character string corresponding to the designated display magnification (α) as the display target characters (step S2501).

In this manner, partial character strings with which the user can easily associate the display contents of an entire item object are set beforehand as the select character strings in the display target character select table. Accordingly, the user can easily determine the display contents of the entire item object even when not all the constituent characters indicating the display contents are displayed after a magnification change, and convenience of the user in the operation to check the display contents of each item object can be increased.

This modification may also be applied in the modifications described in (1) to (3) and (5).

(7) In the above embodiment, even if the character display rate is lower than 100% in the display control process, a notification to that effect is not displayed in the display area of the item object. However, the display form in the display area may differ depending on whether the character display rate is 100% or whether the character display rate is lower than 100%. In this manner, the user may be notified that not all the display contents are displayed in the current display area.

For example, in a case where the character display rate is lower than 100%, a predetermined symbol (such as "*") may be attached to the head or the end of the character string of the display object displayed in the current display area (in this case, the number of characters displayed in the display area is made smaller than the number of area displayable characters by one so as to secure the display space for displaying the symbol in the display area).

Specifically, the magnification-changed display process shown in FIG. 8 may be modified as shown in FIG. 27. In Modification 3 of FIG. 8 shown in FIG. 27, the procedures with the same processing contents as the corresponding procedures in FIG. 8 are denoted by the same step numbers as those in FIG. 8, and explanation of those processing contents is not repeated herein. Only the different aspects are described below.

If the result of the determination in step S804 is positive (step S804: YES), the control unit 60 sequentially selects, from the character string indicating the display contents of the current display object, characters that are one smaller in number than the updated number of area displayable characters, as display target characters, starting from the top of the characters (step S2701). The control unit 60 then displays the character string formed by attaching the symbol "*" to the head of the character string formed with the selected display target characters, in the display areas of the current item object and the current display object in accordance with the updated operating screen information about the current item object (step S2702).

The symbol may not be added and displayed. Instead, in step S806 in FIG. 8, the color of the display target characters may be made to differ from the color of the characters to be displayed in step S807

By this operation, the user can easily determine whether all the character string indicating the display contents is displayed in the display area of the item object, and the display contents checking operation can be performed with high efficiency.

This modification may also be applied in the modifications described in (1) to (6).

(8) In the above embodiment, in a case where the character display rate is lower than 100%, a process is performed so that the display magnification for characters at the time of a magnification change becomes lower than the designated display magnification, regardless of whether the display object is a character string that is input by the user. However, this process may not be performed in a case where the display object is a character string that is input by the user.

Specifically, information indicating whether the display object is a user input object may be added to the type of each display object in the operating screen information, and the display magnification change process shown in FIG. 7 may be modified as shown in FIG. 28. In Modification 4 of FIG. 7 shown in FIG. 28, the procedures with the same processing contents as the corresponding procedures in FIG. 8 are denoted by the same step numbers as those in FIG. 8, and explanation of those processing contents is not repeated herein. Only the different aspects are described below.

If the result of the determination in step S702 is positive (step S702: YES), the control unit 60 determines whether the type of the current display object is a user input object (step S2801). If the current display object is a user input object (step S2801: YES), the control unit 60 moves on to the procedure in step S705. If the current display object is not a user input object (step S2801: NO), the control unit 60 moves on to the procedure in step S703.

In a case where the user inputs a display object, and there is no need for the user to check the display contents of the display object, the process of making the display magnification for characters at the time of magnification change lower than the designated display magnification may not be performed.

As for a display object one does not wish strangers to see (such as a mail address or a telephone number of the user), the process of making the display magnification for characters at the time of a magnification change lower than the designated display magnification is not performed, and the display contents of the item object are not displayed at all. Thus, security can be maintained.

This modification can also be applied in the modifications described in (1) to (7).

(9) In the above embodiment, if the result of the determination in step S703 is negative (step S703: NO) in the display control process, the control unit 60 conducts default display of each item object. However, in a case where the designated display magnification (α) is lower than 100%, default display is not conducted. Instead, each item object may be displayed at the current non-character display magnification. In a case where the display object of the current item object is text, the current character display magnification for the display object may be set at the designated display magnification (α), the numerical values in the corresponding fields in the operating screen information may be updated based on the set display magnification, and each item object may be reduced and displayed at the designated display magnification (α) in accordance with the updated operating screen information.

This modification can also be applied in the modifications described in (1) to (8).

(10) In the above embodiment, a magnification change instruction is received through a pinching-in or pinching-out operation. However, a magnification change instruction may be received by some other method. For example, an enlargement/reduction instruction button may be displayed on the operating screen, and a period during which the button is touched is detected. A magnification change instruction can also be received in this manner.

In this case, a change in magnification can be calculated from the detected touch operation period, and a designated display magnification (α) can be calculated in the same manner as in the display control process of the above embodiment.

This modification can also be applied in the modifications described in (1) to (9).

The present invention relates to a display device that displays character strings on display frames of a predetermined shape, and particularly, can be used as a technology for controlling display of character strings that do not fall within the display frames.

According to an embodiment of the present invention, in the above described structure, when a designated display magnification is higher than the display magnification in the default display state, the display magnification for the display frame is changed to the designated display magnification, and the display magnification for the character string to be placed on the display frame is changed to a lower display magnification than the designated display magnification. Accordingly, the number of characters falling within the display frame at the changed magnification can be made larger than that in the default display state by the number equivalent to the difference between the two display magnifications.

As a result, in a case where the display character to be placed on the display frame does not fall within the display frame in the default display state, the characters that do not fall within the display frame among the characters constituting the character string can be displayed in the display frame having the changed magnification, as the number of characters falling within the display frame having the changed magnification is increased. Accordingly, the characters that do not fall within the display frame in the default display state can be displayed in the display frame having the changed magnification, without any influence on the space efficiency and the display layout of the display frame in the default display state. Thus, the convenience of the user is not reduced.

As only the characters falling within the display frame having the changed magnification are displayed, any character of the character string is not displayed outside the display frame having the changed magnification, and characters that do not fall within the display frame (or characters that overflow from the display frame) in the default display state can be displayed in a display form that is easy for the user to see.

Here, the magnification changing unit preferably sets the second display magnification so that the difference between the first display magnification and the second display magnification becomes larger as the first display magnification becomes higher.

In this structure, the display magnification for the character string is set so that the difference between the display magnification for the display frame and the display magnification for the character string to be placed on the display frame becomes larger as the display magnification for the display frame becomes higher. Accordingly, the user can increase the display magnification to be set for the display frame by increasing the designated display magnification, and can increase the number of characters falling within the display frame having the display magnification changed by enlarging the difference between the two display magnifications. Thus, all the constituent characters of the character string to be placed on the display frame are eventually displayed in the display frame, and the user can certainly check the contents of the character string.

Here, the magnification changing unit preferably sets the second display magnification so that the difference between the first display magnification and the second display magnification becomes larger as the proportion of the characters displayed in the display frame at the time of reception of the designation relative to the total number of characters constituting the character string becomes lower.

In this structure, the display magnification for the character string is set so that the difference between the display magnification for the display frame and the display magnification for the character string to be placed on the display frame becomes larger as the proportion of the characters displayed in the display frame at the time of reception of the display magnification designation relative to the total number of characters constituting the character string to be placed on the display frame in the default display state becomes lower. Accordingly, even when the number of characters that do not fall within the display frame prior to a magnification change, the user can display, in the display frame having the changed magnification, many of the characters that do not fall within the display frame, and the convenience of the user in a display contents checking operation can be further increased.

Here, if all the characters constituting the character string are displayed in the display frame at the time of reception of the designation, the magnification changing unit preferably refrains from performing the magnification change process, sets the display magnification for the display frame at the first display magnification, and sets the display magnification for the character string so that the display magnifications for the display frame and the character string are changed at the same rate.

In this structure, if all the constituent characters of the character string to be placed on the display frame are displayed in the display frame when the display magnification designation is received, the display magnification for the display frame and the display magnification for the character string are changed at the same rate. Accordingly, the character string is enlarged and displayed in accordance with the magnification change, and the visibility of the displayed character string can be increased for the user.

Here, character display regions are preferably assigned to the display frame in the default display state, and the constituent characters of the character string are preferably divided and assigned to the respective character display regions. The magnification changing unit preferably further sets the display magnification for the respective character display regions at the first display magnification in the magnification change process, and the display control unit preferably performs control so that only the characters falling within the character display regions having the display magnification changed to the first display magnification are displayed, the only characters being of the constituent characters assigned to the respective character display regions.

The character string is preferably formed with two or more words, and the words are preferably assigned to the character display regions one by one.

In this structure, the character display regions are assigned to the display frame, and the constituent characters of the character string to be placed on the display frame are divided and assigned to the respective character display regions. In the character display regions, a magnification change is performed so that the display magnification for the constituent characters to be displayed in the character display regions is lower than the display magnification for the character display regions. Accordingly, for each of the groups of the constituent characters assigned to the respective character display regions, the number of characters falling within the character display regions having the changed magnification can be made larger than that in the default display state by the number equivalent to the difference between the two display magnifications.

In a case where the character string to be placed on the display frame is formed with two or more words, for example, the words are assigned to the respective character display regions one by one. In this manner, control can be performed so that the number of the constituent characters of each of the words constituting the character string increases in each corresponding character display region. Accordingly, even in a case where not all the constituent characters of the character string are displayed in the display frame yet, the display contents of the entire character string can be easily recognized.

In a case where the constituent characters of the character string is increased in order of the arrangement sequence, for example, it is difficult to recognize the contents of the entire character string in a display state in which the word at the end of the character string is not displayed. However, if at least one of the constituent characters of each of the words constituting the character string is displayed, the words can be associated with the displayed characters, and the display contents of the entire character string formed with the words can be recognized.

Here, the receiving unit preferably further receives designation of an application range of the magnification change process, and the magnification changing unit preferably performs the magnification change process if the display frame is displayed in the designated application range, and refrains from performing the magnification change process if the display frame is not displayed in the designated application range.

In this structure, the magnification change process in which the display magnification for the display frame and the display magnification for the character string to be placed on the display frame differ from each other is performed only for the display frame displayed in the range designated as the application range. Accordingly, the user can select only the display frame whose contents he/she wishes to check, and then check the display contents. Thus, the convenience of the user in the operation to check the display contents of the display frame can be increased.

Here, the display device preferably further includes a storage unit that stores a table showing the correspondence relation between the first display magnification and predetermined constituent characters of the character string, the predetermined constituent characters being formed with the characters falling within the display frame having the magnification changed to the first display magnification when the magnification for the characters is changed to the second display magnification. The display control unit preferably performs control so that the constituent characters corresponding to the designated first display magnification in the table are displayed, the constituent characters being of the character string.

In this structure, the display device stores the table that shows the correspondence relation between the first display magnification, which is the display magnification set for the display frame, and the predetermined constituent characters formed with the characters falling within the display frame having the magnification changed to the first display magnification when the magnification for the character string to be placed on the display frame is changed to the second display magnification, which is the display magnification set for the character string, the predetermined constituent characters being of the character string. The predetermined constituent characters corresponding to the first display magnification designated at the time of a magnification change are displayed. Accordingly, if characters with which the user can easily associate the entire character string are set as the predetermined constituent characters, the user can easily associate the entire display contents with displayed characters even when not all the constituent characters indicating the display contents are displayed in the display frame yet after a magnification change. Thus, the convenience of the user in the display contents checking operation can be increased.

Here, the display device preferably further includes a determining unit that determines whether the character string subjected to the magnification change process falls within the display frame having the magnification changed to the first display magnification. If the character string does not fall within the display frame, the display control unit preferably displays a notification to that effect in the display frame.

Accordingly, if the character string does not fall within the display frame having the changed magnification, a notification to that effect is displayed. Thus, the user can efficiently perform the operation to check the display contents of the display frame.

Here, the display device preferably further includes a character string determining unit that determines whether the character string to be placed on the display frame is a character string input by a user. If the character string is a character string input by a user, the magnification changing unit preferably refrains from performing the magnification change process.

Accordingly, in a case where the user inputs a display object and there is no need for the user to check the display contents of the display frame, the unnecessary magnification change process can be skipped.

Although the present invention has been described and illustrated in detail, it is clearly understood that the same is by way of illustrated and example only and is not to be taken by way of limitation, the scope of the present invention being interpreted by terms of the appended claims.

What is claimed is:
1. A display device comprising:
a display;
a receiver configured to receive a designation to change a display magnification; and a hardware processor configured to display a display frame and a character string within the display frame on the display, wherein when the receiver receives the designation to enlarge the display magnification to a first display magnification and when a part of a predetermined character string is displayed within the display frame, the hardware processor is configured to:

determine whether all the characters constituting the predetermined character string are displayed within the display frame, enlarge the display magnification of the display frame to the first display magnification using a first enlargement ratio and display the enlarged display frame on the display, and increase a number of characters of the character string displayed within the enlarged display frame based on the hardware processor determining that all the characters constituting the predetermined character string are not displayed within the display frame, the number of characters of the character string displayed within the enlarged display frame being greater than a number of characters of the part of the predetermined character string displayed on the display frame, wherein when the receiver receives the designation to enlarge the display magnification:

the characters of the character string displayed within the enlarged display frame are displayed to be magnified at a second display magnification using a second enlargement ratio, and the first enlargement ratio used for the first display magnification of the display frame is a higher enlargement ratio than the second enlargement ratio used for the second display magnification of the characters of the character string displayed within the enlarged display frame.

2. The display device according to claim 1, wherein the hardware processor sets the second display magnification so that a difference between the first display magnification and the second display magnification becomes larger as the first display magnification becomes higher.

3. The display device according to claim 1, wherein the hardware processor sets the second display magnification so that a difference between the first display magnification and the second display magnification becomes larger as a proportion of characters displayed in the display frame at the time of reception of the designation relative to the total number of characters constituting the character string becomes lower.

4. The display device according to claim 1, wherein a plurality of character display regions are assigned to the display frame in a default display state, and the constituent characters of the predetermined character string are divided and assigned to the respective character display regions, the hardware processor further sets a display magnification for the respective character display regions at the first display magnification, and the hardware processor causes the display to display only characters falling within the character display regions having the display magnification changed to the first display magnification, the only characters being of the constituent characters assigned to the respective character display regions.

5. The display device according to claim 4, wherein the predetermined character string is formed with a plurality of words, and the words are assigned to the character display regions one by one.

6. The display device according to claim 1, further comprising:

a touch panel configured to accept designation of an application range of enlarging to the first display magnification, wherein the hardware processor causes the display to display the display frame displayed in the application range while enlarging the display frame to the first display magnification, and the hardware processor causes the display to display the character string while increasing the number of characters constituting the character string displayed in the enlarged display frame.

7. The display device according to claim 1, further comprising:

a storage device storing a table showing a correspondence relation between the first display magnification and the predetermined character string, the character string being formed with characters falling within the enlarged display, when accepting the designation the first display magnification, wherein the hardware processor causes the display to display the characters corresponding to the designated first display magnification in the table, the characters being of the predetermined character string.

8. The display device according to claim 1, wherein when the entirety of the predetermined character string is not displayed even though the number of characters is increased and displayed, the hardware processor causes the display to display a notification to that effect in the display frame.

9. The display device according to claim 1, wherein the hardware processor determines whether the character string to be displayed on the display frame is a character string input by a user, and when the hardware processor determines that the character string is a character string input by a user, the hardware processor does not increase the number of characters.

10. An image forming apparatus comprising the display device according to claim 1.

11. The display device according to claim 1, wherein the designation of the display magnification received by the receiver is designation of display magnification for enlarging the display from a default display state.

12. A display control method implemented in a display device, the display control method comprising:

displaying a display frame and a character string within the display frame on a display of the display device;

receiving a designation to enlarge a display magnification of the display of the display device to a first display magnification;

determining whether all the characters constituting the predetermined character string are displayed within the display frame;

enlarging the display magnification of the display frame to the first display magnification using a first enlargement ratio and displaying the enlarged display frame on the display when the designation to enlarge the display magnification to the first display magnification is received; and increasing a number of characters of the character string displayed within the enlarged display frame based on determining that all the characters constituting the predetermined character string are not displayed within the display frame when a part of a predetermined character string is displayed within the display frame before the enlarging, wherein the number of characters of the character string displayed within the enlarged display frame is greater than a number of characters of the part of the predetermined character string displayed on the display frame before the enlarging, wherein when the designation to enlarge the display magnification is received:

the characters of the character string displayed within the enlarged display frame are displayed to be magnified at a second display magnification using a second enlargement ratio, and the first enlargement ratio used for the first display magnification of the display frame is is a higher enlargement ratio than the second enlargement ratio used for the second display magnification of the characters of the character string displayed within the enlarged display frame.

13. A non-transitory recording medium storing a computer readable display control program to be executed by a computer used in a display device, causing the computer to carry out:

displaying a display frame and a character string within the display frame on a display of the display device;

receiving a designation to enlarge a display magnification of the display of the display device to a first display magnification;

determining whether all the characters constituting the predetermined character string are displayed within the display frame;

enlarging the display magnification of the display frame to the first display magnification using a first enlargement ratio and displaying the enlarged display frame on the display when the designation to enlarge the display magnification to the first display magnification is received; and increasing a number of characters of the character string displayed within the enlarged display frame based on determining that all the characters constituting the predetermined character string are not displayed within the display frame when a part of a predetermined character string is displayed within the display frame before the enlarging, wherein the number of characters of the character string displayed within the enlarged display frame is greater than a number of characters of the part of the predetermined character string displayed on the display frame before the enlarging, wherein when the designation to enlarge the display magnification is received:

the characters of the character string displayed within the enlarged display frame are displayed to be magnified at a second display magnification using a second enlargement ratio, and the first enlargement ratio used for the first display magnification of the display frame is is a higher enlargement ratio than the second enlargement ratio used for the second display magnification of the characters of the character string displayed within the enlarged display frame.

14. The non-transitory recording medium according to claim 13, further comprising causing the computer to carry out:

setting the second display magnification so that a difference between the first display magnification and the second display magnification becomes larger as the first display magnification becomes higher.

15. The non-transitory recording medium according to claim 13, further comprising causing the computer to carry out:

setting the second display magnification so that a difference between the first display magnification and the second display magnification becomes larger as a proportion of characters displayed in the display frame at the time of reception of the designation relative to the total number of characters constituting the character string becomes lower.

16. The non-transitory recording medium according to claim 13, further comprising causing the computer to carry out:

assigning a plurality of character display regions to the display frame in a default display state, the constituent characters of the predetermined character string being divided and assigned to the respective character display regions;

setting a display magnification for the respective character display regions at the first display magnification; and displaying only characters falling within the character display regions having the display magnification changed to the first display magnification, the only characters being of the constituent characters assigned to the respective character display regions.

17. The non-transitory recording medium according to claim 16, wherein the predetermined character string is formed with a plurality of words, and the words are assigned to the character display regions one by one.

18. The non-transitory recording medium according to claim 13, further comprising causing the computer to carry out:

accepting designation of an application range of enlarging to the first display magnification;

displaying the display frame displayed in the application range while enlarging the display frame to the first display magnification; and displaying the character string while increasing the number of characters constituting the character string displayed in the enlarged display frame.

19. The non-transitory recording medium according to claim 13, further comprising causing the computer to carry out:

storing a table showing a correspondence relation between the first display magnification and the predetermined character string, the character string being formed with characters falling within the enlarged display, when accepting the designation the first display magnification; and displaying the characters corresponding to the designated first display magnification in the table, the characters being of the predetermined character string.

20. The non-transitory recording medium according to claim 13, wherein when the entirety of the predetermined character string is not displayed even though the number of characters is increased and displayed, the computer is caused to carry out displaying a notification to that effect in the display frame.

21. The non-transitory recording medium according to claim 13, further comprising causing the computer to carry out:
   determining whether the character string to be displayed on the display frame is a character string input by a user, wherein
   when the determining is that the character string is a character string input by a user, the number of characters is not increased on the display during the displaying.

* * * * *